(12) United States Patent
Butler

(10) Patent No.: US 10,217,181 B2
(45) Date of Patent: Feb. 26, 2019

(54) DIGITAL WATERMARKING SYSTEMS AND METHODS

(75) Inventor: John F. Butler, Salt Lake City, UT (US)

(73) Assignee: MEDIAPORT ENTERTAINMENT, INC., Salt Lake City, UT (US)

(*) Notice: Subject to any disclaimer, the term of this patent is extended or adjusted under 35 U.S.C. 154(b) by 0 days.

(21) Appl. No.: 12/608,725

(22) Filed: Oct. 29, 2009

(65) Prior Publication Data

US 2010/0169652 A1  Jul. 1, 2010

Related U.S. Application Data

(60) Provisional application No. 61/109,806, filed on Oct. 30, 2008.

(51) Int. Cl.
*H04L 9/00* (2006.01)
*H04L 9/32* (2006.01)
(Continued)

(52) U.S. Cl.
CPC .......... *G06T 1/0021* (2013.01); *G06F 21/10* (2013.01); *H04N 1/32144* (2013.01);
(Continued)

(58) Field of Classification Search
CPC .......... G06F 21/10; G06F 21/32; G06F 21/16; G06F 21/21; G06F 2221/0733;
(Continued)

(56) References Cited

U.S. PATENT DOCUMENTS

| 7,484,100 B1* | 1/2009 | Grossman | H04N 21/235 380/201 |
| 7,487,128 B2* | 2/2009 | Spagna | G06F 21/10 705/51 |

(Continued)

*Primary Examiner* — Linglan E Edwards
(74) *Attorney, Agent, or Firm* — Loza & Loza, LLP; Tyler J. Barrett

(57) ABSTRACT

Systems and methods for protecting digital content using digital watermarks and for distributing that protected digital content are described. The digital watermark contains watermark information, fingerprint information, and any other information desired by the provider of the digital content. To insert the digital watermark in the digital content, a section of the digital content is selected, whether it is a random section or a desired section (such as the first or last section), and then that section is broken into a given number of individual slides. The digital watermark is created as an additional slide or frame and then placed between the slides of that section. These individual slides, which now contain the watermark, are re-combined and then re-attached to the remainder of the digital content when desired, such as on the fly or at the time of the user's purchase of the digital content. The user (or other viewer) receives only a single packet of information for the digital content, rather than numerous packets of information, preventing compression and decompression processes from avoiding the watermark since any such compression would not only diminish the slide with the watermark on it, but also the content and render the digital content unusable. Other embodiments are described.

14 Claims, 11 Drawing Sheets

(51) Int. Cl.
*G06T 1/00* (2006.01)
*H04N 19/467* (2014.01)
*H04N 21/8358* (2011.01)
*H04N 1/32* (2006.01)
*G06F 21/10* (2013.01)

(52) U.S. Cl.
CPC ....... *H04N 19/467* (2014.11); *H04N 21/8358* (2013.01); *G06F 2221/0733* (2013.01); *H04L 2463/101* (2013.01)

(58) Field of Classification Search
CPC . G06T 1/0021; G06T 1/0071; H04N 21/8358; H04N 19/467; H04N 1/32144; H04L 9/3247; H04L 2463/101
USPC .................................. 713/176; 380/200–203
See application file for complete search history.

(56) References Cited

U.S. PATENT DOCUMENTS

| | | | |
|---|---|---|---|
| 7,580,543 B2* | 8/2009 | Iwamura | G06T 1/0035 382/100 |
| 8,230,226 B2* | 7/2012 | Srinivasan | G10L 19/018 713/176 |
| 2002/0141584 A1* | 10/2002 | Razdan et al. | 380/203 |
| 2003/0204727 A1* | 10/2003 | Sasaki | G06F 21/16 713/176 |
| 2004/0101160 A1* | 5/2004 | Kunisa | 382/100 |
| 2006/0072784 A1* | 4/2006 | Iwamura | 382/100 |
| 2006/0282676 A1* | 12/2006 | Serret-Avila et al. | 713/176 |
| 2008/0235808 A1* | 9/2008 | Gutta et al. | 726/28 |
| 2009/0070587 A1* | 3/2009 | Srinivasan | G10L 19/018 713/176 |
| 2009/0103774 A1* | 4/2009 | Grossman | H04N 21/235 382/100 |

* cited by examiner

WATERMARK INFORMATION 110

Content Provider Name 112
Provider Contact Information 114
Copyright & License Information 116
Other Watermark Information 118

FINGERPRINT INFORMATION 120

User Name 122
User Contact Information 124
User Billing Information 126
User Fingerprint information 128

OTHER INFORMATION 130

DIGITAL WATERMARKING SYSTEMS AND METHODS

This application claims priority of U.S. Provisional Application Ser. No. 61/109,806, filed on Oct. 30, 2008, the entire disclosure of which is incorporated herein by reference.

FIELD

This application relates generally to systems and methods for protecting digital content. In particular, this application relates to systems and methods for protecting digital content using digital watermarks and systems and methods for distributing that protected digital content.

BACKGROUND

Many types of information and content are now stored digitally, including books, music, movies, software programs, video games, databases, advertisements, as well as other content. Because such content is stored digitally, it can be transferred and sold easily using many types of electronic networks. See, for example, U.S. Pat. Nos. 5,875,110, 4,412,292, 5,848,398, 6,397,189, 6,381,575, 4,674,055, 5,445,295, 5,734,719, 6,286,029, 6,799,165, 6,655,580, 6,330,490, 6,662,080, 6,535,791, 6,711,464, 5,237,157, 6,654,757, 5,794,217, and 6,748,539. Both private and public electronic networks, including the internet, are frequently used to transfer the digital content.

But the digitization of content has also presented content providers, whether publishers or owners, with challenging problems. Digital content is often easy to copy and easy to distribute after it is sold. This situation makes unauthorized distribution of the digital content a concern for content providers because the unauthorized distribution detracts both from the revenue received from, and the control over, the digital content.

Current attempts at controlling the unauthorized copying and distribution of digital content include the use of digital watermarks. Digital watermarking is the process of altering the original data file by adding hidden data or information (i.e., copyright notices or verification messages) to the digital content without the user's knowledge. Such hidden data often contains information pertaining to the digital content or to the author of the digital content that can be used to either restrict the use of the digital content or as a mechanism to track the use of the digital content. Anyone with knowledge of the watermark and how it can be recovered can determine to some extent whether or not significant changes occurred to the digital content. With digital watermarks, the digital content cannot be typically altered without sacrificing the quality or utility of the digital content itself.

SUMMARY

This application describes systems and methods for protecting digital content using digital watermarks and for distributing that protected digital content. The digital watermark contains watermark information, fingerprint information, and any other information desired by the provider of the digital content. To insert the digital watermark in the digital content, a section of the digital content is selected, whether it is a random section or a desired section (such as the first or last section), and then that section is broken into a given number of individual slides. The digital watermark is created as an additional slide or frame and then placed between the slides of that section. These individual slides, which now contain the watermark, are re-combined and then re-attached to the remainder of the digital content when desired, such as on the fly or at the time of the user's purchase of the digital content. The user (or other viewer) receives only a single packet of information for the digital content, rather than numerous packets of information, preventing compression and decompression processes from avoiding the watermark since any such compression would not only diminish the slide with the watermark on it, but also the content and render the digital content unusable.

BRIEF DESCRIPTION OF THE DRAWINGS

The following description can be better understood in light of the Figures, in which:

FIG. 1 details a block diagram of some embodiments of a digital watermark

FIGS. 2 and 3a-3d illustrate some embodiments of methods for applying a digital watermark to digital content;

Figure 4:
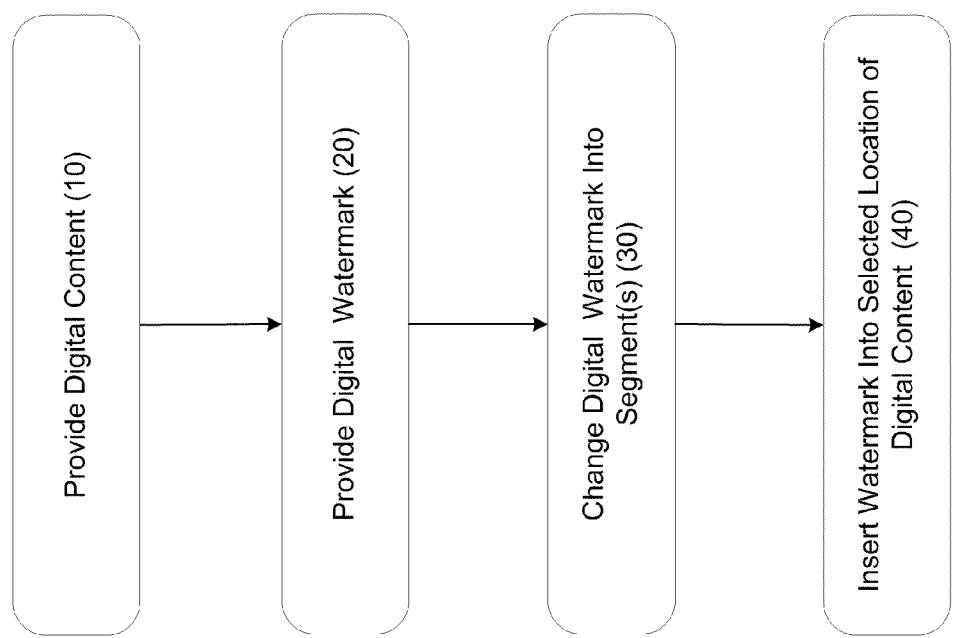
FIG. 4 illustrates some embodiments of methods for recovering a digital watermark from digital content.

Together with the following description, the Figures demonstrate and explain the principles of the systems and methods for protecting digital content and for distributing protected digital content. In the Figures, the thickness and configuration of components may be exaggerated for clarity. The same reference numerals in different Figures represent the same component.

DETAILED DESCRIPTION

The following description provides specific details in order to provide a thorough understanding. Nevertheless, the skilled artisan would understand that the systems and methods can be practiced without employing these specific details. Indeed, the systems and methods can be practiced by modifying the illustrated systems and methods and can be used in conjunction with apparatus and techniques conventionally used in the industry. For example, while the digital watermark is described for protecting digital content that is distributed to a user, it could be used with any digital content, whether or not it is distributed to a user. As well, while the protected digital content is described for being distributed via a kiosk, it can be distributed via any stand-alone electronic device or any electronic device connected to an electronic network (such as the internet).

One example of a digital watermark that can be used to protect any desired digital content is depicted in FIG. 1. The digital watermark 100 contains watermark information 110, fingerprint information 120, and any other information 130. In some embodiments, any of the watermark information 110, fingerprint information 120, or other information 130 can be provided by a provider of the content (a content provider), whether the provider is an owner of the content or not. Non-limiting examples of content providers include concert promoters, music publishers, video publishers, recording companies, movie studios, television studios, book publishers, artists, mobile telephone companies, video game manufacturers, and advertisers. In other embodiments, the watermark information 110, fingerprint information 120, and/or any other information 130 can be provided by anyone other than the content provider, such as the publisher or other DRM providers.

The watermark information 110 can comprise any information about the source of the digital content, whether that entity is the content provider or not. One example of the source information includes the source name 112, which can include the name (or other identifying information of the content provider). The watermark information 110 can also contain the source contact information 114, which can include the address (or other contact information, such as an email address, username on a particular web site [like Facebook or Ebay], phone numbers, etc.) of the source. As well, the source contact information 114 could also include purchasing habits, advertising, or coupon redemption.

The watermark information 110 can also contain copyright and license information 116. This type of information may include any and all information regarding the rights, privileges, licenses, and other legal information about the digital content or the source of the digital content. The information 116 that can be associated with any given digital content may include any number or combination of restrictions, including those that are enabled by any known technology. Non-limiting examples of such restrictions include a restriction that visual or textual content not be printed in hardcopy; a restriction that copy-and-paste functions are disabled for textual content; a restriction that a music file may not be played after a certain date; a restriction that a music file may only be played a fixed number of times; and a restriction that a file may only be copied to another device—or otherwise distributed—a fixed number of times. Other examples of restrictions include limitations on the number of CDs that can be created from a music file, limitations on the number of devices that a music file may be played on, and limitations on the number of times that a music file can be copied and used within a music play list. Yet other examples of the restrictions are known in the art and/or described in the patents mentioned above.

The copyright and license information 116 can have multiple versions or combinations of any particular restriction or number of restrictions. With multiple versions of the same restriction, alternative conditions for accessing and using the same digital content can be used for any given type of restriction. Thus, the same restriction can be tailored for different conditions (such as a wireless transfer or transfer directly from a kiosk) that might arise when the digital content is used and/or accessed.

In some embodiments, the copyright and license information 116 can contain both a transactional restriction and a specification restriction. The transactional restriction corresponds to the method in which the digital content can be used or distributed, including the restrictions listed above. The specification restriction, on the other hand, specifies the conditions which must be satisfied prior to the transaction restriction being exercised. As an example, the specification restriction could include a promotion code which must be used before the transactional restriction of content distribution can be exercised, or a specific demographic be identified before an advertisement, movie trailer, or movie be sold.

Any type (and number) of specification restrictions known in the art can be used. One example of a specification restriction includes a copy count specification that limits the number of copies of the content which may be exercised or used at the same time. Another example is a control specification that controls the interactions between the content owners and distributors. Another example of a specification restriction is a time specification that assigns a start date, duration, and/or finish date when the digital content may be used and/or accessed. Yet another example is a security specification that provides for various security mechanisms to be used. Still another example is an authorization specification that controls any authorization criteria that must be satisfied. Finally, incentive specifications that motivate the user to access use the digital content in a specific manner are another example of a specification restriction.

The transaction restriction(s) in the copyright and license information 116 can be used to manage/control any type of transaction known in the art, or combination of transactions, that uses the digital content. One type of transaction is a registration transaction where a secure channel with the user of the content is established. Another example is a login transaction that can check the authenticity of a user. Another example includes a billing transaction where a user pays for certain rights to the digital content. Another example is a copy transaction where one or more copies of the digital content can be made with the same or lesser rights. Another example is a transfer transaction where copies of the content are transferred to another location. Another example is a loan transaction for loaning or borrowing copies of digital content, after which they are automatically returned after a predetermined time period. Another example is a play transaction which uses the digital contents in some manner, i.e., reading a digital book. Another example is an extract transaction where a part of a digital content is used to create new digital content containing that part. Another example is an embed transaction where the whole digital content becomes part of another digital content. Yet other examples of these transactions include print transactions, backup transactions, restore transactions, delete transactions, edit transactions, install transactions, uninstall transactions, and combinations thereof.

The specific restriction or combination of restrictions for any given copyright and license information 116 may be provided by anyone that comes in contact with the digital content. Examples of such persons include the content provider, an operator of a system or device on which the digital content permanently or temporarily resides, a party which distributes the content, a purchaser of the content, or a user of the content. Other examples of such persons include licensees, licensors, and partners of any of the above. In some embodiments, the digital content is provided by the owner of the digital content or indirectly by one or more third parties that that act on behalf of the owners of the content.

In some embodiments, the digital content may optionally contain instructions indicating how the content may be used, distributed, sold, transmitted, or otherwise processed (use instructions). These use instructions can be converted into digital rights management (DRM) information that can be associated with the desired content. The DRM information may include any number or combination of restrictions, including those that are enabled by a DRM technology and that are selected by a content provider.

The DRM information may be provided by a third party (such as a content provider) or by an operator of a system or device on which the digital content permanently or temporarily resides. Either may assign a unique transactional ID to each piece of digital content. This unique transactional ID correlates to a set of use instructions and DRM specifications to control how the associated content is managed on devices on which the content temporarily or permanently resides. The digital content may therefore contain metadata (i.e. metatags), use instructions, and a transactional ID.

In the embodiments illustrated in FIG. 1, the watermark information 110 can also contain other watermark information 118 known in the art. Examples of the other watermark information includes where the digital content was bought, who bought it, email address or other contact information provided by the user, promotion used during the purchase, loyalty program number of the user, special licensing abilities, timed usage (for rental or subscription models), number of times played and/or accessed, and/or any known metadata. The metadata (i.e., metatags) can correspond to information about any desired digital content, such as a genre of music or movie, an artist, a content provider, content release date, or other information. The metadata could also contain advertising data for the desired content, such as a coupon or information about the artist. The metadata can include information on how the user can get or take delivery of the digital content.

The metatags may be provided by a content provider or an operator of a system or device on which the digital content either permanently or temporarily resides. The metatags may indicate the use instructions for all content that is provided, with distinct use instructions for each piece of content, or with use instructions based on parameters that can be used to classify the content. In one example of use instructions, a content provider may indicate that music performed by musical artist A may be redistributed freely, without restriction, music performed by musical artist B may be redistributed freely when purchased at a set price, and music performed by musical artist C may be redistributed in a manner that permits the music to be copied to another computer three times, after which the music may not be copied to another computer, but only played (performed) on a computer where it is stored.

The digital content may optionally be encrypted in a manner to increase security of the content during storage or transmission of the content between devices. Any number of encryption methods known to those in the art may be used to implement this feature. Examples of such encryptions include both symmetrical and asymmetrical encryption using a variety of methods, including RSA, DES, Triple DES, AES, Blowfish, ElGamal, RC4, CSS, or combinations thereof.

As shown in FIG. 1, the digital watermark 100 also contains fingerprint information 120. The fingerprint information 120 may comprise information about the user (whether a purchaser, recipient, distributor, etc.) of the digital content. In some configurations, the fingerprint information can be substantially similar to some of the information that is designated as watermark information 110. The fingerprint information 120 can include a user name 122, such as the name (or other identifying information) of a person or business receiving the digital content. The fingerprint information 120 can also include user contact information 124, such as the physical address, email address, telephone number, or similar information about a user of the digital content. The fingerprint information 120 may also include user billing information 126, such as a credit card number that was used to purchase a digital content. The fingerprint information 120 can also include other fingerprint information 128, which includes any other information about the user of the digital content, such as biometric information.

In some embodiments, the digital watermark 100 can also contain any other information 130. The other information 130 in the digital watermark 100 can include any other information known in the art that can be included in a digital watermark. Examples of the types of other information 130 include information identifying the digital content, important dates pertaining to the digital content (such as the creation date, any modification date, etc.), format information of the digital content, instructions indicating how the content may be used, distributed, sold, transmitted, or otherwise accessed, information identifying the licensee or performer associated with that digital content, specific file information (including the file title and length), a format element that identifies the format of the digital content, header element for the file, a provider element that can specify information about the content provider, a purchase element defining rules for purchasing the content, a blackout element for geographically restricting access to given content, a rating element specifying the rating level for a particular rating scale or standard (i.e., MPAA rating), device capabilities element for specifying the requirements for a device that receives the content, a cost element detailing the price of the content, a subscription element specifying those services on which a given piece of content is available for subscription purposes, an override element for overriding any of the other elements, an authorization element for authorizing any number of activities, a location element that specifies the location of the user, a renewal element that represents a possible set of renewal options for the content, or any combinations thereof.

The digital watermark 100 may exist in any form known in the art. The form of the digital watermark 100 used may depend on the type of the digital content to which it may be applied. For example, when the digital content comprises an audio recording, the digital watermark 100 may be encoded into a sound waveform, or may take the form of digital information that is added the digital audio recording. As another example, when the digital content comprises audio/visual information, the digital watermark 100 may be digitally encoded data which is added to the audio/visual content, or a visual representation that may be added to the audio/visual content. As another example, when the digital content comprises a video recording, the digital watermark 100 can be in the form of video data. When represented visually, the digital watermark 100 may be encoded using symbols, digits, signs, characters, colors, patterns, graphics, or any other form of visual information.

In some embodiments, a single digital watermark is associated with a single piece of digital content. In other embodiments, a single digital watermark can be associated with multiple pieces of digital content. In these embodiments, a single digital watermark can be created and used repeated with different pieces of digital content. In yet other multiple digital watermarks can be associated with single piece of digital content. The multiple digital watermarks could all contain the same information and thereby serve as duplicative in nature. But the multiple digital watermarks could each contain portions of the information illustrated in FIG. 1 and described herein and when combined, could operate as a single digital watermark 100. For example, a first digital watermark could contain part or all of the watermark information 110, a second watermark could contain part or all of the fingerprint information 120, and a third watermark could contain all of the rest of the information (i.e., a portion of the watermark information, a portion of the fingerprint information, and the other information 130).

The digital watermark can be associated with any desired digital content. The types of digital content are virtually unlimited. Examples of the digital content include music, movies (including trailers), video games (including trailers), software, mobile phone ring tones, electronic books (audio books, e-books,), advertising, other types of content, including emerging content where a movie is made based on a user's image which becomes the image of the actor in the movie (similar to a hybrid role playing game). The format in which the digital content is stored is also virtually unlimited. Examples of the types of digital formats include pdf, doc, xls, jpeg, tiff, gif, xbm, pnm, mpeg2, mpeg4, mp3, oma, m4a, wma, wmv, mov, way, and avi, as well as combinations thereof. The digital content can be provided in any known language.

The digital watermark 100 can be hidden in the digital content or it can be apparent to the user that the watermark is present. Where its presence is apparent to the user, the watermark can produce a disruption or anomaly in the digital content. For example, a digital watermark that is represented acoustically in an audio digital content may disrupt or distort the audio. When hidden, though, the presence of the watermark is not known by the user and cannot be easily perceived or detected.

Where the digital watermark is not apparent to the user, it can be hidden in the digital content using any embedding technique known in the art. The digital watermark(s) can be associated with the digital content using any process, including the exemplary processes described in FIGS. 2-3. The processes depicted in these Figures may be performed in alternative orders, combined with other processes, or even specific parts of the illustrated process can be performed instead of the whole process illustrated. And once the watermark has been associated with the digital content, it can remain with that digital content on every device or apparatus on which the digital content resides (whether temporarily of permanently), stored, distributed, and/or transferred because watermark is linked to—or associated with—that digital content, whether it is either permanently linked, or linked for a specific time, specific action, or specific promotion/life cycle.

Figure 2:
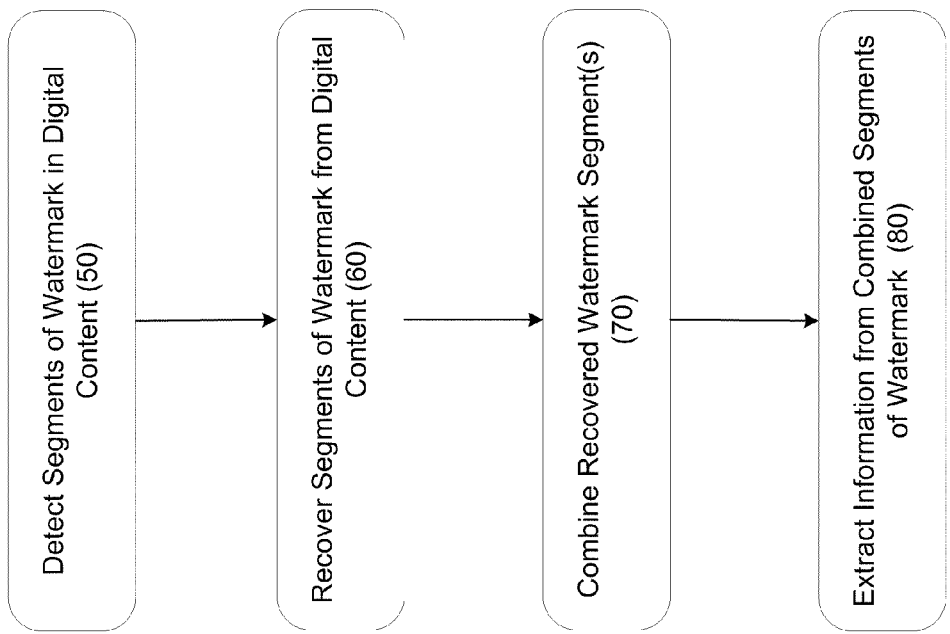

The process depicted in FIG. 2 begins when the digital content is provided, as shown in block 10. The digital content can be provided by the content provider, whether that is an owner, publisher, distributor, or some other entity. The process continues when a digital watermark is provided, as shown in block 20. In some embodiments, the digital watermark 100 can be created automatically by software that inserts it on the fly. The software operates on any electronic device in which the digital content is stored (whether temporarily or permanently) or used for transmission of the digital content. In other embodiments, the digital watermark can be provided by an insertion process (whether manual or automatic) using a pre-existing watermark.

The digital watermark can be provided in any desired format. In some embodiments, the digital watermark can be provided in the form of a single segment. In other embodiments, the digital watermark can be provided in the format of a multiple segments. Those segments can be in the form of frames, slides, or the like. The digital watermark can be provided by the content provider, the operator of the system/ device which the digital content temporarily or permanently resides, or anyone with unrestricted access to the digital content.

If the watermark 100 is not in the desired number of segment(s), the digital watermark can be modified into the desired format. For example, if the watermark is provided in the format of a multiple frames, but only a single frame is desired, the various frames can be combined into a unitary segment. As well, if the watermark is provided in the format of a single frame, but multiple frames are desired, the watermark can be divided or separated into individual frames, as shown in block 30. The digital watermark 100 may be divided into any number of frames (or segments) to suit the desired purpose of the watermark. Typically, the watermark can contain from 1 to any desired number of frames (or segments), whether those frames (or segments) are located in a single location or multiple locations of the digital content. For example, where there are three different segments in the digital watermark, a first segment could be located near the beginning of the digital content, a second segment could be placed near the middle, and the third segment could be placed near the end of the digital content.

Figures 3A, 3B, 3C, 3D:
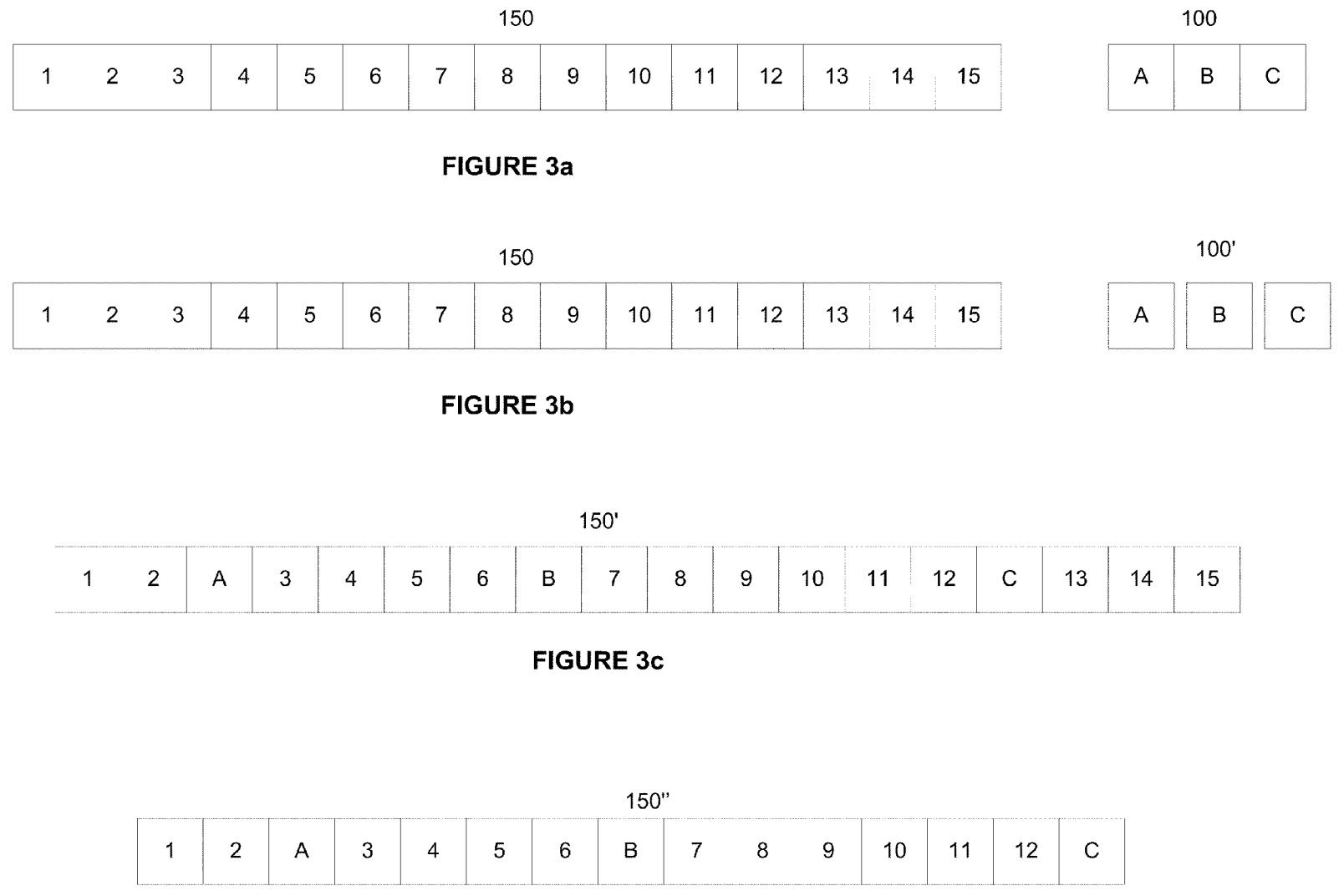

Any process for separating the digital watermark into segments can be used, including the process illustrated in FIGS. 3a-3c. FIG. 3a shows a digital watermark 100 as it exists in a unitary configuration. FIG. 3b shows digital watermark 100 after it has been divided into segments 100a, 100b, and 100c. The block representations of a digital content 150 and digital watermark 100 may be representations of frames in an audio/visual digital content, time frames of an audio digital content, pixels of a picture digital content, and the like. For purposes of illustration, fifteen frames of digital content 150 and three frames of a digital watermark 100 are shown in FIGS. 3a-3c. However, digital content 150 and digital watermark 100 may have any number of frames (or segments).

The length of digital watermark frames 100a-100c may be determined, at least in part, by the size of the digital watermark 100 in relation to the size of the digital content 150. The length (or size) of the digital watermark can also depend on the amount of information in the digital watermark, as well as promotional restrictions, rewards, reward programs, loyalty programs, or product purchases. In some embodiments, the digital watermark 100 may be divided into frames or segments that are too small to be recognized by human perception. For example, in an audio digital content, a digital watermark may comprise frames of audio frequencies that are imperceptible to humans. Alternatively, digital watermark may comprise short frames of audio (or video) that are interspersed between the audio (or video) digital content and that are imperceptible to the human ear (or eye).

The size of the frames 100a-100c will depend, in some embodiments, on the length of the frame that will not be detected, as well as the amount of information needed to be contained in each frame. In some embodiments, the watermark could intentionally be made detectable (whether by vision, hearing or other mechanisms), including appearing as a logo in a bottom corner of a screen. The frames 100a-100c may contain all the watermark information of the digital watermark or, alternatively, may contain any subdivision or combination of the watermark information 110, fingerprint information 120, of other information of the digital watermark 100 described above. As well, any frame of a digital watermark may contain verification information, back-up information, redundant information, or combinations thereof that may be used to recover any loss of the watermark information, whether accidental or otherwise.

Returning to FIG. 2, the exemplary process illustrated in that drawing then inserts the digital watermark into the selected locations of the digital content, as shown at block 40. The digital watermark 100 can be inserted as a single frame, as a plurality of single frames in multiple locations, as a multiple frames in a single location, or as multiple frames in multiple locations. The digital watermark 100 may be inserted randomly, pseudo randomly, or into pre-selected locations of the digital content. For example, with reference to FIGS. 3a-3c, and in the case that digital content 150 comprises audio/visual digital content and digital watermark 100 comprises video frames, the digital watermark frames 100a-c may be inserted between video frames of digital content 150 randomly. A random selection of insertion locations may result in digital watermark frames 100a-c that are located proximate one another, which may increase the ability of the digital watermark 100 to be perceived. Thus, the insertion locations may be pre-selected so that digital watermark segments 100a-c are inserted into locations so that their ability to remain hidden is maximized. Examples of such locations may be portions of audio silence in an audio digital content, portions of video that are devoid of motion in a video digital content, or in a previously distorted portion of an audio or video digital content.

The digital watermark frames 100a-c may be inserted into the digital content 150 prior to—or at the time of—the distribution of the digital content either to the user of an electronic device (through which the digital content will be transmitted) or the purchaser/user of the digital content. For example, a digital watermark 100 may be inserted at the time that a digital content is purchased, for example, on the internet or at a kiosk by a user. On the other hand, a digital watermark may be inserted into a digital content prior to distribution when the digital content will be physically shipped or downloaded to pre-determined users.

FIG. 3c shows the digital watermark segments 100a-c from FIG. 3b that have been inserted between specific frames of digital content 150. The digital content 150' shown in FIG. 3c comprises the original fifteen frames of the digital content 150 from FIG. 3b and an additional three frames (A, B, C) of digital watermark 100. After insertion of the digital watermark 100 into the digital content 150, the digital content 150' of FIG. 3c comprises eighteen frames. Of course, the relative sizes of the frames 1-15 and A-C in FIG. 3a, b, c, and d is for illustration purposes only and they could be smaller or larger than those depicted.

In some instances, such as when the length of the digital content needs to be preserved, some portions of the digital content may be removed. In some embodiments, removal of the watermark would result in the digital content not being able to be accessed, used, or replayed. FIG. 3d shows a digital content 150" that has been truncated to exclude the terminating three segments (13-15) of the digital content 150' from FIG. 3c. Digital content 150", therefore, is substantially the same length as the digital content 150 before the addition of digital watermark 100' from FIG. 3b. Removal of segments of the digital content 150' may be performed by truncating the digital content, randomly removing segments from the digital content 150', pseudo-randomly removing segments from the digital content 150', and/or removing pre-selected segments of the digital content 150'. Selecting segments of digital content 150' for removal may be performed with the similar considerations as described with reference to selecting insertion locations for digital watermark segments 100a-c. The digital content frames (i.e., 13-15) may be removed prior to, or at the time of, the distribution of the digital content.

In some embodiments, the frames of the digital content 150 that are removed can be replaced with frame(s) of the digital watermark 100. When frames of the digital content 150' are removed at the time of inserting the digital watermark 100, the segments may be removed at substantially the same time as insertion of the digital watermark segments.

In some embodiments, the watermark is associated with the digital content in the following manner. The file for the digital content is divided into two parts: a content part and a description part. The content part contains the main information of the digital content, i.e., a picture, text, or music. The description (or descriptor) part contains any information that allows examination of the content part without accessing that content part. For example, the descriptor part could contain an indication of the size of the content part.

The description part can contain a series of descriptor blocks (or blocks). The blocks can contain any amount desired information. For example, the blocks can include an identifier block to uniquely identify the content, a starting block to provide a starting address for the file, a length block to show the size of the content part, etc.

In some embodiments, the digital watermark can be contained in the descriptor part of the file and can be attached to the content part in a variety of ways. In some embodiments, the description part of the file is created separate from the content part and the two parts are combined to create the file. In these embodiments, the description part can be created before, after, or at the same time as the content part is created or obtained. In other embodiments, the description part and the content part are created as a whole rather than being combined into a whole.

In some embodiments, the digital watermark can be contained in the content part of the file and can be attached to the descriptor part in a variety of ways. In some embodiments, the description part of the file is created separate from the content part and the two parts are combined to create the file. In these embodiments, the content part can be created before, after, or at the same time as the descriptor part is created or obtained. In other embodiments, the description part and the content part are created as a whole rather than being combined into a whole.

In some embodiments, the blocks in the description part will be the same for an entire file and so will be attached all at the same time. In other embodiments, the blocks in the description part will be different and so may all be added at the same time or at different times. For example, a first set of blocks can be attached to the content part when the digital content is created. When the digital content is copied, transferred or loaned, a second (or third or fourth, etc. . . . ) set of blocks can be specified and then attached.

Once inserted, the digital watermark can be detected in the digital content for any reason, such as to verify the authenticity of the digital content or to prevent further copying of the digital content. Detecting the segments of a digital watermark 100 in the digital content 150 comprises searching for the digital watermark segments at the known pre-selected insertion locations. Alternatively, detecting segments of a digital watermark may comprise scanning the digital content for segments containing information that identifies a segment as a digital watermark segment, typically performed when the location(s) of the watermark segment(s) is not known.

As well, once the segments of the watermark have been detected, the information contained in the segments can be examined without the need to remove them from the digital content. For example, the watermark information 110, fingerprint information 120, and any other information 130 that was contained in the digital watermark can be viewed while the watermark segment(s) remains in the digital content.

In other embodiments, the digital watermark could be used to retrieve information about the digital content or its use. The watermark could collect data (like a cookie) and then use any known electronic communications network (such as the internet) to send the data to another location. For example, the digital watermark could detect that a certain user has accessed a specific movie and then sends this information to the content owner who can add that data to a data mining site operated by the content owner. The next time that user viewed or otherwise accessed that particular watermarked movie, the watermark could be used to obtain a movie trailer for a similar movie which can then optionally be viewed by the same user.

In some embodiments, the detection and examination methods described above can be part of a method for retrieving or recovering the watermark. While the recovery can be performed by anyone possessing the digital content, it is typically performed by the content provider for any desired purpose, such as determining infringement or piracy in a legal criminal or civil case or data mining for marketing, sales, etc. The watermark can be retrieved or recovered using any method which does not destroy the information in the digital watermark and/or does not damage the digital content. One example of such a method includes the process exemplified by FIG. 4. The method in FIG. 4 comprises detecting segments of a digital watermark in a digital content as shown in block 50, recovering segments of the digital watermark from the digital content as shown in block 60, if necessary combining the recovered digital watermark segments as shown in block 70, and then extracting the information from the combined segments of the digital watermark as shown in block 80. In some configurations, the method in FIG. 4 substantially reverses the process described in FIG. 2.

The digital watermark 100 may be applied to—and recovered from—any digital content 150 using a variety of electronic devices, including any known computing systems that contain the appropriate firmware or software for the watermark. These computing systems can also be used to transmit, transfer, distribute, and otherwise manage the digital watermark, digital content, or watermarked content. Prior to discussing the details of computer system, it should be understood that the following description is presented largely in terms of steps and operations that may be performed by conventional computer components. These computer components, which may be grouped in a single location or distributed over a wide area, generally include computer processors, memory storage devices, display devices, input devices, etc. In circumstances where the computer components are distributed, the computer components are accessible to each other via communication links, such as those illustrated in FIG. 11. The computer system could have fewer or greater number of components than those illustrated in FIG. 11. Thus, the depiction of the computer system should be taken as illustrative and not limiting. For example, the computer system could implement various services components and peer-to-peer network configurations to implement at least a portion of the processes.

Figure 11:
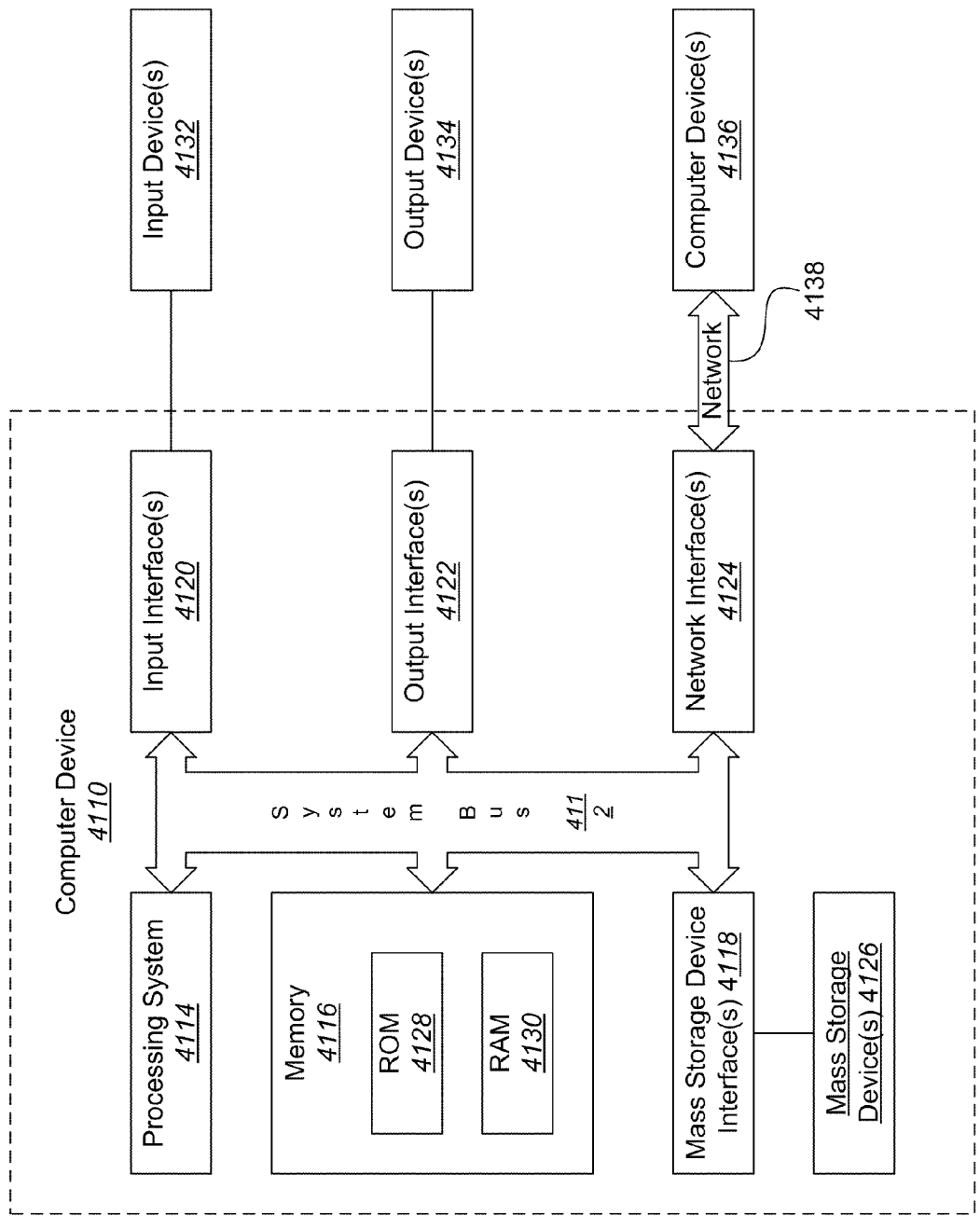
FIG. 11 illustrates an exemplary computer system that can be used in the systems described herein.
Figure 12:
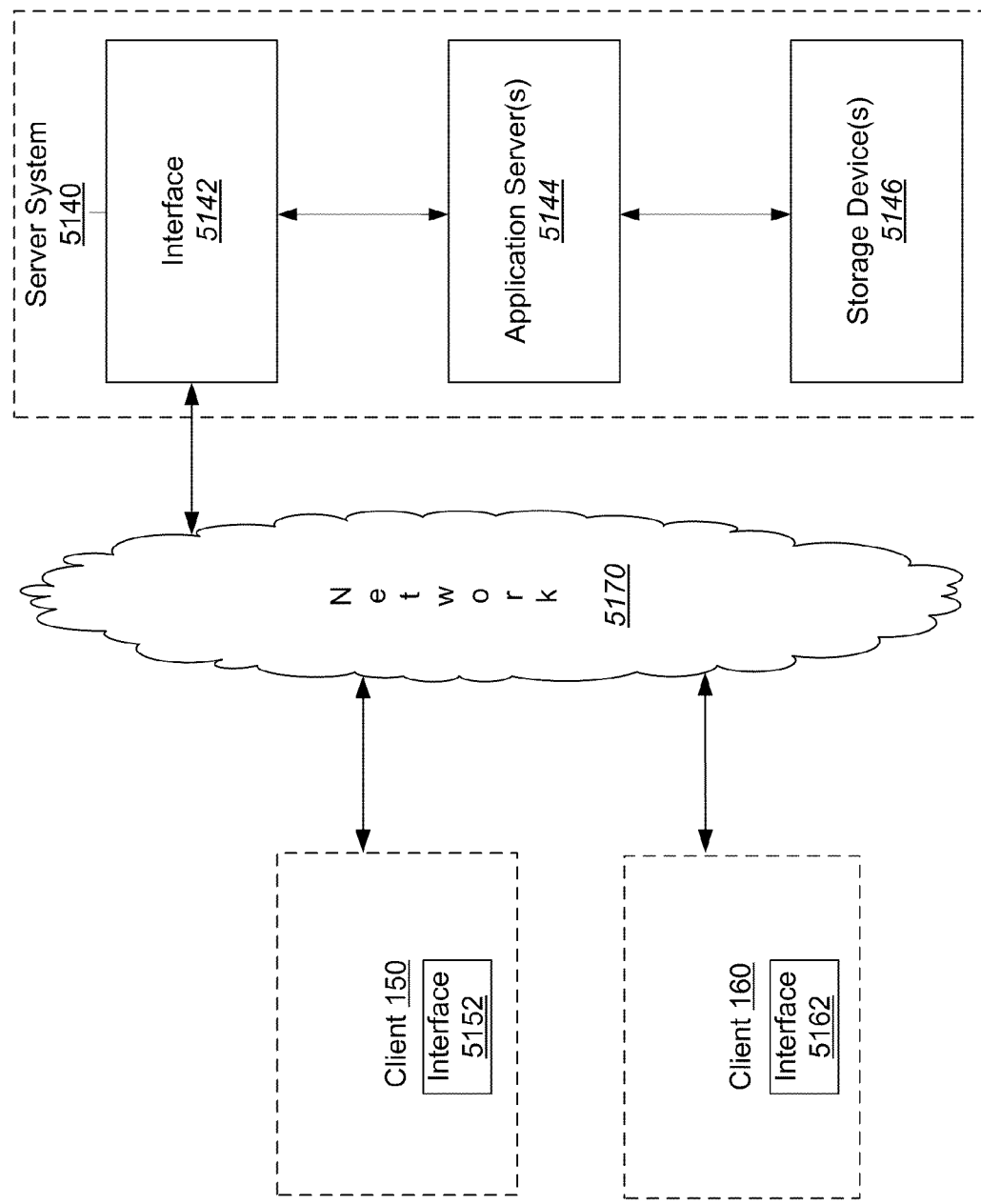
FIG. 12 illustrates an exemplary computer network that can be used in the systems described herein.

In some embodiments, FIGS. 11-12 illustrate one computer operating environment in which the computer system may be implemented. These embodiments contain one or more computer readable media that may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 11, the computer system includes computer device 4110, which may be a general-purpose or special-purpose computer. For example, computer device 3110 may be a personal computer, a notebook computer, a tablet computer, a personal digital assistant ("PDA"), or other hand-held device, a workstation, a minicomputer, a mainframe, a supercomputer, a multi-processor system, a network computer, a processor-based consumer electronic device, or the like.

The computer device 4110 includes system bus 4112, which may be configured to connect various components thereof and enables data to be exchanged between two or more components. The system bus 4112 may include one of a variety of bus structures including a memory bus or memory controller, a peripheral bus, or a local bus that uses any of a variety of bus architectures. Typical components connected by system bus 4112 include processing system 4114 and memory 4116. Other components may include one or more mass storage device interfaces 4118, input interfaces 4120, output interfaces 4122, and/or network interfaces 4124.

The processing system 4114 includes one or more processors, such as a central processor and optionally one or more other processors designed to perform a particular function or task. It is typically processing system 4114 that executes the instructions provided on computer readable media, such as on memory 4116, a magnetic hard disk, a removable magnetic disk, a magnetic cassette, an optical disk, or from a communication connection, which may also be viewed as a computer readable medium.

The memory 4116 includes one or more computer readable media that may be configured to include or includes thereon data or instructions for manipulating data, and may be accessed by processing system 4114 through system bus 4112. The memory 4116 may include, for example, ROM 4128, used to permanently store information, and/or RAM 4130, used to temporarily store information. ROM 4128 may include a basic input/output system ("BIOS") having one or more routines that are used to establish communication, such as during start-up of computer device 4110. RAM 4130 may include one or more program modules, such as one or more operating systems, application programs, and/or program data.

One or more mass storage device interfaces 4118 may be used to connect one or more mass storage devices 4126 to system bus 4112. The mass storage devices 4126 may be incorporated into or may be peripheral to computer device 4110 and allow computer device 4110 to retain large amounts of data. Optionally, one or more of the mass storage devices 4126 may be removable from computer device 4110. Examples of mass storage devices include hard disk drives, magnetic disk drives, tape drives and optical disk drives. A mass storage device 4126 may read from and/or write to a magnetic hard disk, a removable magnetic disk, a magnetic cassette, an optical disk, or another computer readable medium. Mass storage devices 4126 and their corresponding computer readable media provide nonvolatile storage of data and/or executable instructions that may include one or more program modules such as an operating system, one or more application programs, other program modules, or program data.

One or more input interfaces 4120 may be employed to enable a user to enter data and/or instructions to computer device 4110 through one or more corresponding input devices 4132. Examples of such input devices include a microphone, a joystick, a game pad, a satellite dish, a scanner, a camcorder, a digital camera, a tactile input device, and the like. Some examples of tactile input devices can include a keyboard and alternate input devices, such as a mouse, trackball, light pen, stylus, touchpad, touch-screen, or any other suitable pointing device. Similarly, examples of input interfaces 120 that may be used to connect the input devices 4132 to the system bus 4112 include a serial port, a parallel port, a game port, a universal serial bus ("USB"), a firewire (IEEE 1394), or another interface.

One or more output interfaces 4122 may be employed to connect one or more corresponding output devices 4134 to system bus 4112. Examples of output devices include a speaker, a printer, a visually perceptible output device (e.g., a monitor, display screen, or any other suitable visualization device), and the like. A particular output device 4134 may be integrated with or peripheral to computer device 4110. Examples of output interfaces include a video adapter, an audio adapter, a parallel port, and the like.

One or more network interfaces 4124 enable computer device 4110 to exchange information with one or more other local or remote computer devices, illustrated as computer devices 4136, via a network 4138 that may include hard-wired and/or wireless links. Examples of network interfaces include a network adapter for connection to a local area network ("LAN") or a modem, wireless link, or other adapter for connection to a wide area network ("WAN"), such as the Internet. The network interface 4124 may be incorporated with or peripheral to computer device 4110. In a networked system, accessible program modules or portions thereof may be stored in a remote memory storage device. Furthermore, in a networked system computer device 4110 may participate in a distributed computing environment, where functions or tasks are performed by a plurality of networked computer devices.

The system may be operated in networked computing environments with many types of computer system configurations. FIG. 12 represents some embodiments of a networked environment that includes clients 4150 and 4160 connected to a server system 4140 via a network 4170. While FIG. 12 illustrates an embodiment that includes two clients connected to the network, alternative embodiments include one client connected to a network or many clients connected to a network. Moreover, some embodiments also include a multitude of clients throughout the world connected to an electronic network, where the network can be a wide area network, such as the Internet.

Figure 5:
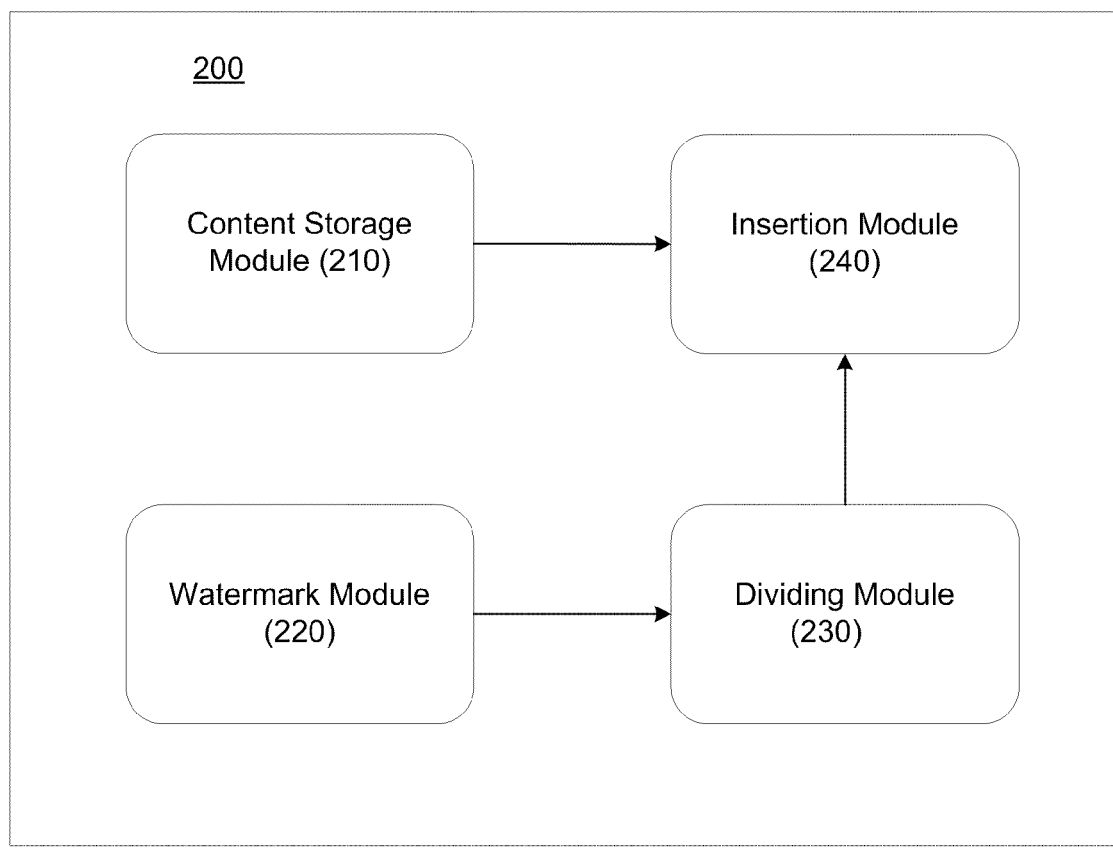
FIG. 5 depicts some embodiments of systems for inserting a digital watermark in digital content.

An example of one component of a computing system that can be used when inserting a watermark into digital content is illustrated in FIG. 5. FIG. 5 shows a digital watermark system 200 comprising a digital content storage module 210, a digital watermark module 220, a digital watermark dividing module 230, and a digital watermark insertion module 240. These modules may be separate modules or may be combined into a module(s) that performs these multiple tasks. Of course, when the system is used to recover a digital watermark, these modules perform in substantial the opposite manner than that described below.

As shown in FIG. 5, the digital content storage module 210 stores the digital content to which a digital watermark will be applied. The storage module 210 may therefore comprise RAM, ROM, or any other type of memory capable of storing a digital content. The storage module 210 may be used for permanent, semi-permanent, or temporary storage of the digital content. For example, the storage module 210 may store a variety of digital content and act as a repository or library for digital content distribution.

The watermark module 220 provides the digital watermark that will be applied to a digital content. Therefore, the digital watermark module 220 may generate a digital watermark or, alternatively, may simply store a pre-made or pre-existing digital watermark that has been provided to it by, for example, the content provider.

The dividing module 230 divides a watermark that has been provided by the digital watermark module 220. The dividing module 230 may make determinations as to how to divide a digital watermark, i.e., in how many segments in which the digital watermark should be divided. After making such a determination, the dividing module then divides the watermark into the desired segments.

The insertion module 240 combines the divided digital watermark with the digital content provided by digital content module 210. Insertion module 240 may be configured to insert the digital watermark into the digital content using any known methods.

Figure 6:
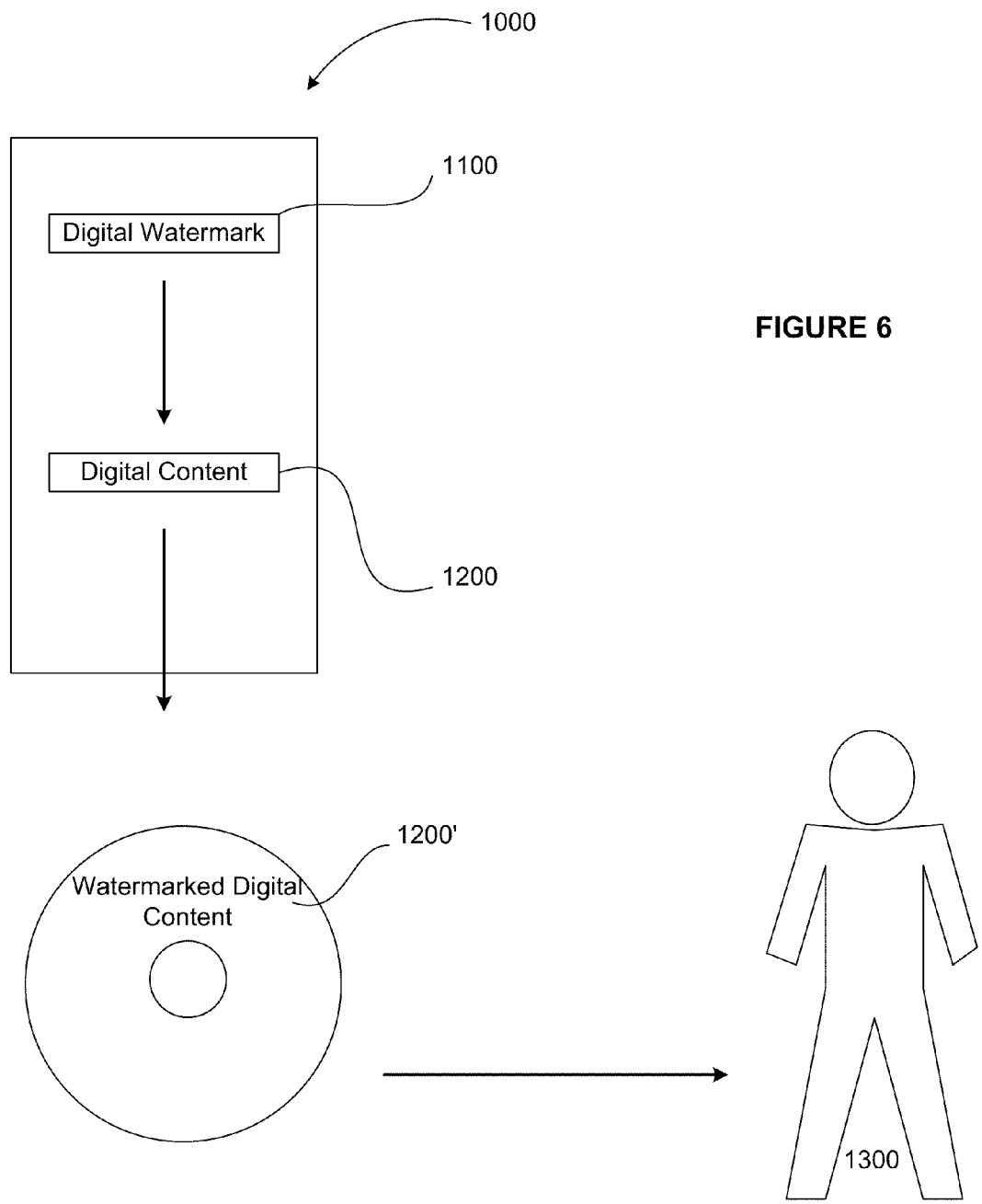
FIG. 6 shows some embodiments of digital watermark systems.

The digital watermark system may be used to carry out any of the methods described herein. For example, as illustrated in FIG. 6, a digital watermark system may be used to apply a digital watermark to a digital content, which is then distributed to a user. The digital watermark system 1000 of FIG. 6 applies a digital watermark 1100 to digital content 1200 to create watermarked digital content 1200'. The digital watermarked content 1200' is then stored by the digital watermark system 1000 for possible later distribution to a user 1300.

In some embodiments, the digital watermark system 1000 applies a digital watermark 1100 to a digital content 1200 before any information is known about the user of the watermarked digital content 1200'. In other embodiments, though, the digital watermark system 1000 acquires information about the user before applying a digital watermark 1100 to a digital content 1200. In these embodiments, the digital watermark system 1000 can include fingerprint information in the digital watermark 1100, which may be used to identify the recipient of a watermarked digital content 1200'. In these latter embodiments, the watermark is incorporated into the digital content in near real time or on-the-fly while the user is interacting with the system 1000.

Figure 9:
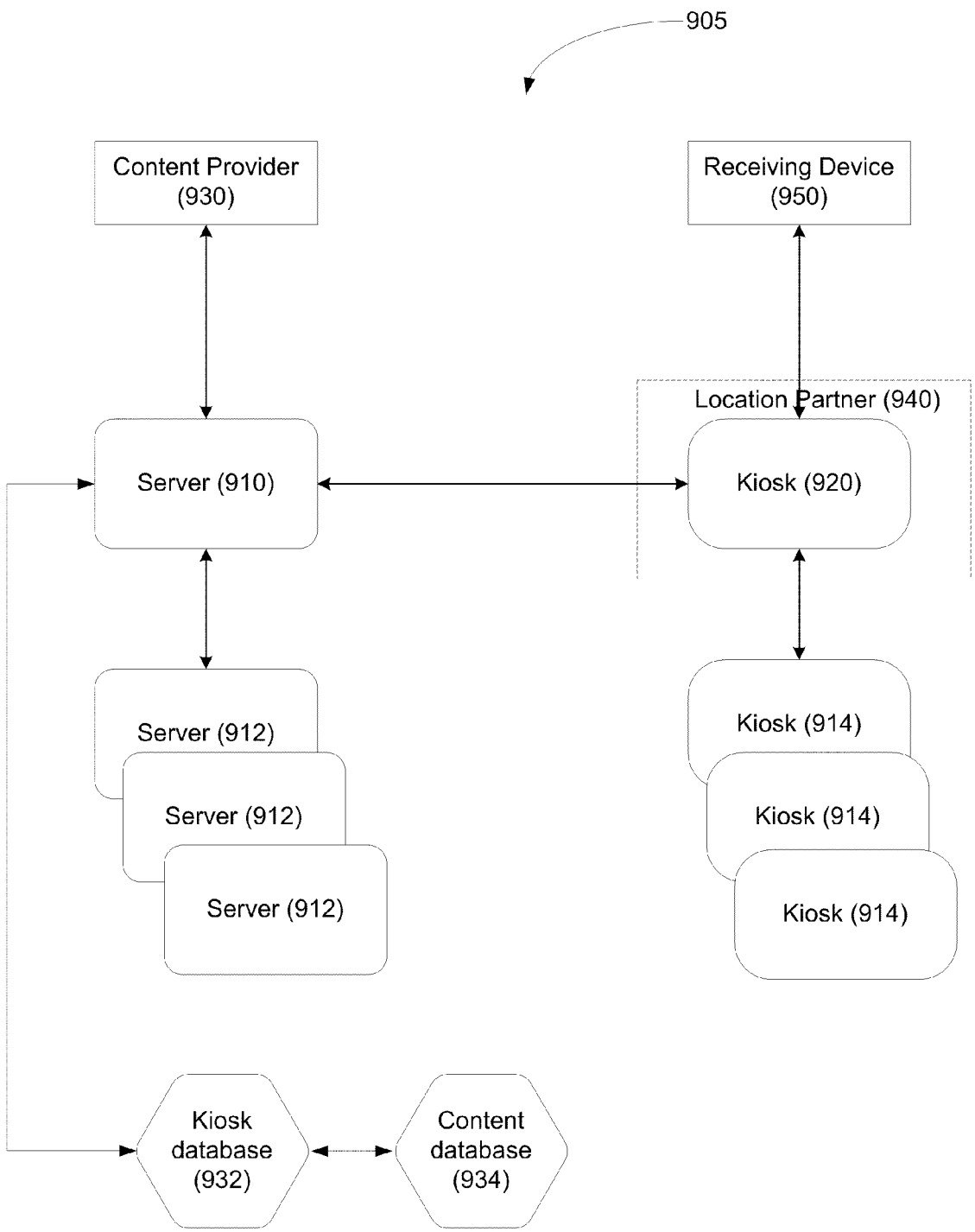
FIG. 9 shows some embodiments of systems used to distribute watermarked digital content.

The protected digital content can be distributed to a user using any known system. Some embodiments of such systems will be described with reference to FIG. 9. FIG. 9 shows a system 905 that contains a storage device (i.e., server 910) in a first location where the digital content can be stored, a distribution device (i.e., kiosk 920) in a second location for delivering the digital content to a user of the distribution device, a receiving device 950 of a user for receiving the digital content that has been distributed, and means for communicating (i.e., a communications link) with the user.

The first location can be located anywhere desired by the operator of the system, including in a central location, or even at a remote location. The first device acts as a repository for any desired digital content. The first device also permits an operator or administrator of the system 905 to manage all of its operations at a single location, permitting roll-out of digital content (and the related materials described herein) across all or select distribution devices and real-time feedback from each distribution device as to its use and functionality.

Any device that can operate in this manner can be used as the first device. One example of the first device comprises a server 910. Any type of server known in the art can be used as server 910. Examples of servers that can be used include a computer running a UNIX-style operating system, a computer running a Microsoft Windows operating system, or a personal computer workstation. The server 910 comprises any storage component on which the digital content can be stored. Examples of storage components include optical storage discs, DVD-RAM discs, and traditional magnetic hard disc drives.

Another example of a storage component includes any known database (or combination of databases). The database stores any desired information, including information regarding the digital content and any user interaction with the system. For example, the database stores data regarding the content inventory at each of the distribution devices. The database can also store sales information, user information, and transactional information. The database may be a Microsoft SQL database, a Microsoft Access database, an Oracle database, a MySQL database or combinations thereof. In some embodiments, the server can contain a kiosk database 932 (or module of a database) for managing and monitoring the kiosks and a content database 934 (or module of a database) for managing and monitoring the digital content.

In some aspects, multiple servers 912 may be connected together to make a server cluster. Using a server cluster permits sharing information regarding the content stored on each server 910 and each transaction the server 910 has recorded. By using a server cluster, the system 100 is always operational, regardless of the location of a particular component on the network that connects the components (such as the internet). The server cluster can contain a primary cluster, which handles all critical tasks, with minor functions being routed to a secondary cluster. With this configuration, if the primary cluster is not operational, most functions can be handled by the secondary cluster. A server cluster also allows for large-scale deployment and interoperability, as well as data that can be stored on the network in multiple points of co-location.

The software components required for operating the server 910 may be included on a single server or on multiple servers, with each server implementing one or more tasks and communicating among themselves using standard networking protocols. Non-limiting examples of the server-focused tasks using the software components that may be implemented on one or more servers 910 include those of e-mail server; Web server; file server; purchase transaction authentication server; transaction push server; user monitoring server; content management server; content synchronization server; content security server; and advertising/promotional message server.

In some embodiments such as where the digital content is recorded, it may be provided internally (by the entity that controls or operates the system 905) or externally by one or more third parties that are the copyright owners of the content or that act on behalf of the owners of the content (i.e., content providers 930). Content providers 930 may provide the content to the server 10 using any known mechanism, including via wired or wireless network connections known in the art or via other methods, such as merely providing a CD or DVD to the operator of the system. In some embodiments, the content providers can provide the digital content to a distribution device(s), which can then be transferred to the server 10.

When the distribution device is placed in a location that is remote from the first device, a location partner 940 can optionally be used in the system 905 as depicted in FIG. 9. The location partner 940 comprises an individual or entity that provides a space where the kiosk may be physically located. Non-limiting examples of such location partners include any of the content providers, owners or managers of airports, bars, clubs, schools, gyms, stadiums, arenas, amusement parks, military bases, retail centers or shops, libraries, universities, and eating establishments.

A location partner 940 may provide this space without charge, as a service to individuals that visit the space where the delivery device is placed. Or the location partner 940 may provide this space in exchange for a fee of some type, or in exchange for advertising time or space on the distribution device, or for other benefits. In some embodiments, the location partner 940 may control or limit the content that is available via the distribution device including the digital content available. In other embodiments, the location partner can also control the advertising at the distribution device.

As described above, the system 905 also contains a distribution device that can be located in a second location that is optionally remote from the first location. The distribution device receives the content from the first or storage device and then distributes that content to a user (i.e., a purchaser). Any device operating in this manner can be used as the distribution device. In some embodiments, the distribution device comprises any known vending machine or any known kiosk, such as the kiosks described herein. The kiosk can be a stand-alone kiosk, a kiosk connected to a private electronic network or a public electronic network (like the internet), or even a hybrid form of a kiosk that can deliver digital content to a set top box or a game system like XBOX.

The kiosk provides a point-of-sale (or rental) experience for any user, including both actual and merely potential purchasers of the digital content. Any person can be a user by interacting with the kiosk, whether by purchasing content or merely viewing the kiosk and/or the content on the kiosk, such as by sampling music contained in the kiosk. In some embodiments, the kiosk can limit the time of interaction with a given user, can limit the viewing of a specific user, and/or limit the transfer of digital content—whether number or time—of a specific user. In some embodiments, the kiosk may physically display any known advertising, such as posters, banners, or adhesive advertisements. The kiosk may also be used in conjunction with products as a point-of-purchase display.

The kiosk can contain any combination of number of video displays. In some embodiments, the kiosk contains two video displays, a first video display that displays advertising messages and a second video display that displays menus, samples of content, and related information appropriate to affect a purchase by an end-user of the content made available through the kiosk. In other embodiments, though, the kiosk can contain only one video display, as well as three or more video displays. The video display can comprise any known displays, including LED displays, TFT displays, LCD displays, CRT displays, touchscreens, and combinations thereof.

The kiosk can also contain multiple input and output devices appropriate to interact with a user, display or perform the content stored on the kiosk, and complete a sales transaction related to the content. These input and output devices may include, for example, one or more of any of the following: a keyboard; a mouse; a trackball; a joystick; a touchscreen; a a label maker; an automatic coupon feeder; a barcode scanner; an image scanner; biometric scanning devices such as a fingerprint, voiceprint, hand geometry, or retinal/iris scanner; a Compact Disc reader; a Compact Disc writer; a video disk reader; a video disk writer; and media device connectivity, including a USB port, an IEEE-1394 FireWire port, a SecureDigital (SD) port, a CompactFlash port, a PCMCIA port, a MemoryStick port, a laser printer, a receipt printer, a video camera, a camera, an audio recorder, a credit/debit/gift card reader, a cash acceptor, a coin acceptor, a check acceptor, a jewel case ejector, a phone docking station, speakers, voice recognition device, signature verifier, facial recognition device, Braille input device, bubble sheet/multiple choice form scanner (such as a Scantron machine), Bluetooth communications, Wi-Fi communications, Wi-Max communications, and other input or output device known in the art. Furthermore, additional input, output, and storage technologies known in the art may be integrated with the kiosk, including any and all mobile or portable devices.

The kiosk can also include a controlling device that operates the video displays, interacts with input and output devices, and communicates with other kiosks or servers 910, in real-time or as needed. In some embodiments, the controlling device includes two or more computers, either sharing or dedicated to the needed tasks requisite to controlling operation. In some configurations, one computer handles the display, selection, and processing of content purchase transactions and a second computer handles the remainder of the tasks required of the kiosk.

Figure 10:
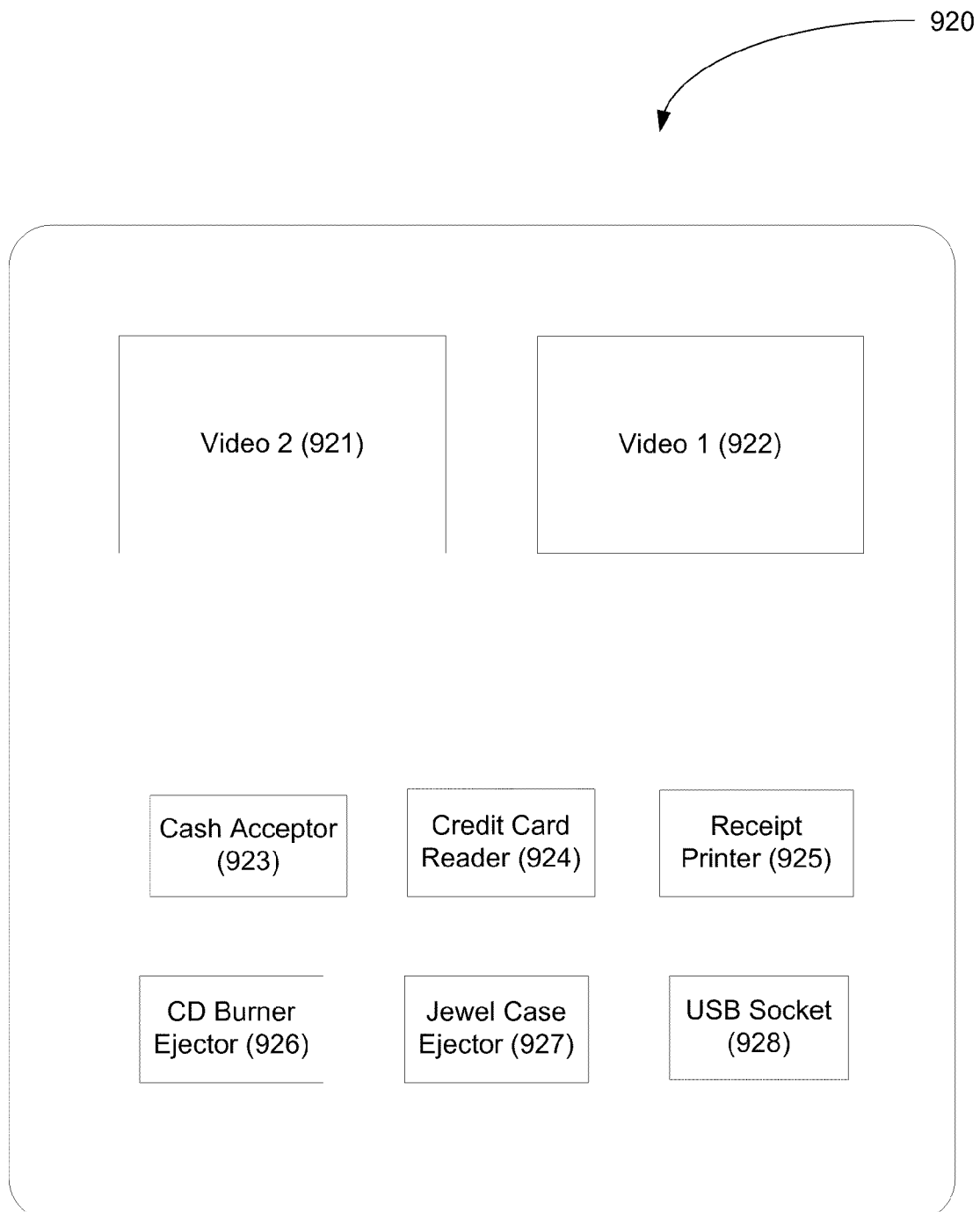
FIG. 10 shows some embodiments of kiosks that can be used to distribute watermarked digital content.

FIG. 10 illustrates one example of kiosk. In FIG. 10, kiosk 920 can contain a video display 921 on which advertising or promotional messages are displayed; a video display comprising 922 a touch screen device through which a user may view and select content; a cash acceptor 923 through which a user may make payment for content; a credit card reader 924 through which a user may make payment for content; a receipt printer 925 that dispenses a paper receipt of a transaction when content is purchased; a CD burner ejector 926 that dispenses an audio CD containing content selected by a user during a purchase transaction; a jewel case ejector 927 that dispenses an empty jewel case for holding an audio CD; and a USB socket 928 to which a user may connect a receiving device for delivery of content, as described herein. In some embodiments, the kiosk 920 could eject the CD that has been placed in a jewel case. As noted previously, a kiosk may contain different—or additional—components than these components, including an end unit that comprises a mobile or portable device, as well as any retail electronic device where content may be bought, viewed or rented.

In some embodiments, the video displays of the kiosk incorporate known touch screen technology. In other embodiments, the video display could be a software application on a portable electronic device (i.e., a cell phone or MP3 player) that can connect to the kiosk (i.e., via Wi-Fi communications technology) and then the portable electronic device then becomes the video display. Thus, it can provide a user interface that presents a visual display of pertinent information during the interaction and distribution processes, as well as operate as a user interface for entry of user commands. In some embodiments, the kiosk also includes any known audio technology, such as speakers or headphones.

The kiosk can include a user-friendly interface, including a graphical user interface with a touch screen capability. If desired, multiple interfaces can be incorporated in the kiosk situated at high traffic locations, such as by being positioned on each side of the kiosk. The user interface comprises a hierarchy of pages that a user navigates through to accomplish different tasks. For example, a user may search for a specific song, title or artist; once the user's selection is found, the selection may be sampled, and eventually purchased. The same process applies to all digital content types where a user can interact with the kiosk to accomplish different tasks associated with the content. In some embodiments, the user interface could include a single source of content so that only one piece of content can be displayed, bought or rented.

The various components of the system 905 can be electronically connected to each other using any means known in the art. In some embodiments, the system 905 contains any known computer network. Computer networks are well known in the field of communications. Computer networks may include communication links that extend over a local area or a wide area, or even be global. Examples of these communication links include Ethernet, frame relay, DSL, satellite uplink, cable modem, analog modem, fiber channel, infrared and microwave transmissions, wireless communications of various types, SMS, and other wired or wireless networking technologies known in the art. Such connections may also be constructed through a publicly accessible network, such as the internet, so long as appropriate security measures, as are known in the art, are used to prevent unauthorized access to the content that passes across the connection. A private network connection may also be used in order to reduce the reliance on such security measures and to further ensure the integrity of content that is transferred via this connection.

The various components of the system 905 are able to communicate with each other whenever needed. In some embodiments, the server 910 and any kiosk 920 may communicate at regular or scheduled intervals, in real-time, or in an ad hoc manner according to needs that arise as determined by the server or the kiosk. Since actual real-time communication may be limited by the transmission speeds available, the communication may be on a substantial or near real-time basis.

In some embodiments, the various components of the system need not be electronically connected. For example, the kiosk need not be connected to the server on a continuous basis. Rather, the kiosk can operate in a stand-alone mode, with digital content being transferred to the kiosk via non-networked means, and purchase transactions and data being collected via non-networked, intermittent means. A stand-alone kiosk can be used, for example, when security procedures or network connectivity are not available, such as a kiosk located on a military base in a different country than the server from which it would otherwise receive content.

The systems described above can be used to transfer the digital content from the first device to the distribution device, where it then can be optionally distributed to an individual user (such as a purchaser) via a receiving device 950. While the digital content can be transferred by the system in any manner, in some aspects, it can be transferred in a semi-dynamic manner, dynamic, or even static manner. The digital content can also be transferred to any distribution device (or group of devices) at once or one at a time.

When the digital content is transferred from the server to the kiosk, the operator of a server may customize which content (or category, group of content, or advertising) is transferred, customize which content is transferred from a server to a particular kiosk (or to a collection of multiple kiosks 914), as well as customize the billing. As well, the server can be used to incorporate the watermark into the digital content.

When a user views the kiosk, purchases content, or otherwise interacts with the kiosk, the kiosk may collect any desired type of data (collected data). Some examples of collected data may include data about the individual user (user data), data about the user's interaction with the kiosk (kiosk data), data concerning the demographics of the kiosk location (location or demographic data), financial data, watermark information, and so forth. The kiosk (or other distribution device) may collect the data in any manner known in the art.

For example, during the user's interaction with the kiosk, the kiosk may gather user data. User data may include any information that relates to the user and/or the user's activities. One example of user data may include conversion data, such as pages viewed, images viewed, color schemes viewed, time of viewing, time of viewing in relation to purchase, content or item(s) purchased/downloaded, requests made, demos/games played, registrations, signups, advertisements viewed, and so forth. Another example of user data may include user browsing activities, such as content viewed, content selected, time spent viewing different content, and total interaction time. Yet another example of user data may be demographic information, such as the user's age, sex, ethnicity, race, marital status, household size, schooling/education, income, profession, languages spoken, citizenship, and the like. Still another example of user information may include survey data, such as consumer satisfaction surveys, expectation surveys, evaluation surveys, polling/voting data, and so forth. Another example user data may include user preference data, such as user selected color schemes, content preferences, advertisement preferences, e-mail preferences, and the like. Another example of user data includes user-indicated items of interest, such as forms and genres of entertainment and hobbies. In yet another example, user data may include user account information, such as username, password, address, phone number, e-mail address, unique login identifiers, cookies, user specific survey/conversion data, etc. In still another example, user data may include biometric data, such as fingerprints, voiceprints, hand geometries, retinal/iris scans, signature verifications, facial recognitions, video feed of end-user, pictures taken of end-user, audio recordings, and the like. Moreover, additional information may be collected and/or extrapolated from the any information/data that has been input by the user.

In some embodiments, the data obtained from the user can include the user's email account. That account can be used to further customize the kiosk experience for the user and/or used for a user to join a community of users. As well, that email account can be used to allow the user to receive additional electronic advertising, including notices of upcoming content, events, products, and similar topics. The user's email account may also be used when sharing the information among a community to which the user belongs. In some instances, the user can have a membership whether or not the user has an email account. For those users having a membership, the interaction can be customized. The member can enter his/her membership when prompted and can then be presented with customized menus based on past interaction/sales patterns. The data obtained from the user can include information about the user's social networks (i.e., MySpace, Facebook, Twitter, etc.).

The collected data also includes kiosk data. The kiosk data can include any of the user's interaction with the kiosk including, as non-limiting examples, the following: the areas of the content navigation system visited by the end-user; the advertising content displayed immediately prior to and during the end-user's interaction with the kiosk; the advertising content displayed immediately prior to and during the end-user's purchase from the kiosk; the nature of the delivery device selected by the end-user; method of payment, and others. For instance, the kiosk data may also include sales transaction data, which may indicate purchases contemplated or completed by the end-user, content sold, content price, royalty information, license numbers, inventory ID numbers, transactional IDs, etc.

The collected data may also include location or demographic data. The location data may relate to the demographic environment at the location of the remote device, i.e., print/design advertising or products associated with remote device, kiosk location, seismic/meteorological activity, local advertisements, local artists, local event calendaring, and so forth.

The collected data also includes financial data. The financial data may include sales transaction data, which may indicate purchases contemplated or completed by the user, content sold, content price, royalty information, inventory ID numbers, transactional IDs, etc. Examples of other types of financial data include payment information, sales information, credit/debit/gift card information, promotional/discount codes, accounting information, and so forth.

The collected data also includes watermark information. The watermark information may include any of the watermark data associated with any specific digital content, who they purchased from, any promotions used, time, etc. or combinations thereof. Examples of the types of watermark information include the digital content, any data that obtains usage patterns, data about transfers of the watermark, etc.

The kiosk can operate in either a continuous or a batch mode. In the continuous mode of operation, the collected data for each transaction is transmitted quickly from the kiosk to the server. Then, the collected data could be deleted from the memory of the kiosk without storing the data at that particular kiosk. In the batch mode, the collected data for each transaction could be retained at the kiosk until such time as the kiosk transmits all of collected data at once.

The collected data may be shared with any external party of the system. The collected data can be shared with the external party by either transmitting the data to them or by allowing them to access the system either directly or indirectly through a Web page/Web portal. In the former situation, the collected data may be optionally collated, analyzed, summarized, or otherwise processed using a variety of steps. This situation may allow the operator of the system to perform the analysis, filter the results, and/or customize the data that is sent to the external party. In the latter situation, the external party can view the collected data before (or as)

it is received from the kiosk(s) or anytime during the analysis, filtering, or customization process. Of course, access to the system by the external party can be established using any parameters desired by the operator of the system and/or the individual user that provided the data, i.e., access may be limited to only certain portions of the collected data.

In certain situations, the collected data can be sent directly to other kiosks, a master database, or other databases (like a loyalty program database with a retailer, discount database, etc.). Such situations can be advantageous when the external party wants to access data from a group of kiosks in the same location or vicinity (i.e., a primary and a secondary kiosk). In these situations, the data can be transmitted to-or-from the secondary kiosk, allowing the external party to access the collected data for both the primary and the secondary kiosks. This situation may give the external party more access to the raw data that has been collected, but does not necessarily allow the operator of the system to analyze, filter, or customize the report. Again, access to the collected data can be established using any parameters desired by the operator of the system, i.e., access may be limited to only certain portions of the collected data.

In some embodiments, the collected data may be purposefully reported to location partners 940 or content providers, including copyright owners. If content providers, copyright owners, or others are due royalties or other payments based on use or sale of content, such royalties or other payments may be made from the operator of a server to the appropriate recipient using automated means known in the art, based upon sales and demographic data. A system operator can also authorize any third party to receive reports and restrict the reports that the third party can access.

All of the collected data from the distribution device(s), Web portal, Cable, WAP portal, OTA (including 3G-4G and alternatives), WAN/LAN, Bluetooth, and/or Web/WAP page can be used for numerous purposes. In some aspects, the collected data can be used to enhance and/or customize the operation of the system. In other aspects, the collected information can be part of the general and specific market research data that can be used by the operator of the system as known in the art. In yet other aspects, the collected information can be used to customize the content and/or the advertising provided to the user (both current advertising and future advertising). For example, the collected data can be used to customize the content delivered to the kiosk or be used to predict the types/genre of media that will be popular to a given user. Alternatively, the collected data can be used to customize the digital content by the time of day, the geographic location, etc. In some embodiments, the collected data can then be used to customize the advertising for a group of users.

The collected data can be used to customize the advertising, promotions, cross promotions, loyalty programs directed to an individual user. The advertising may include messages used to market, promote, or sell products or services; or to enhance brand recognition, as well as training materials, entertainment content, community or location information, and other similar materials. The advertising may also include video clips, audio clips, ring tones, printed coupons, promotional codes, brochures, literature, images, giveaways, discounts associated with digital content, or other promotional or brand-related content. In some embodiments, the advertising may be presented through video and/or audio presentations, animated PowerPoint presentations, flash programs, banners, pop-ups, screen-savers, wallpapers, posters, digital sampling, cost-per-pixel, coupons, tickets, cost-per-click, advertisement images, printed advertisements, trademarks and other similar advertisements. One example of the advertising includes the promotion of artists or performers whose products or content are available for sale on the kiosk and/or who are performing at the event. In still another example of the use of the collected data, it may be used in any method of viral marketing.

The user does not need to be physically present at a kiosk to interact with it. The user can interact with the kiosk via a Web/WAP/WAN/LAN/OTA portal that is in communication with the kiosk. In some embodiments, this communication can comprise a wired connection, such as a user accessing the Web page or Web portal via a desktop computer. In other embodiments, though, the communication can comprise a wireless connection, such as a user accessing the Web page or Web portal via a portable electronic device, like a cellular telephone using SMS technology.

When a user purchases content through a kiosk, that protected content is made available to the user using any receiving device known in the art. The receiving device can be provided by the kiosk or can be provided by the user (i.e., it can be the same as a user's portable electronic device). Non-limiting examples of some content receiving devices can include playback devices or storage devices. Examples of the playback devices include portable computers, MP3 players, iPods®, video players, or mobile/cellular phones. Examples of the storage devices include portable computers, mobile/cellular phones, pagers, text messaging devices, calendar or text information devices, recordable media such as memory chips and cards, CDs and DVDs (or similar video or data discs), writeable data CD such as WORM or CD-RAM, flash drives, USB sticks, or flash memory, or memory storage devices. The digital content may be stored on these receiving devices magnetically, optically, or electronically as well as any other storage mode known in the art. In some aspects, the digital content can be placed on a receiving device, along with migrated plug-ins or software that can be used to play the digital content received.

Figure 7:
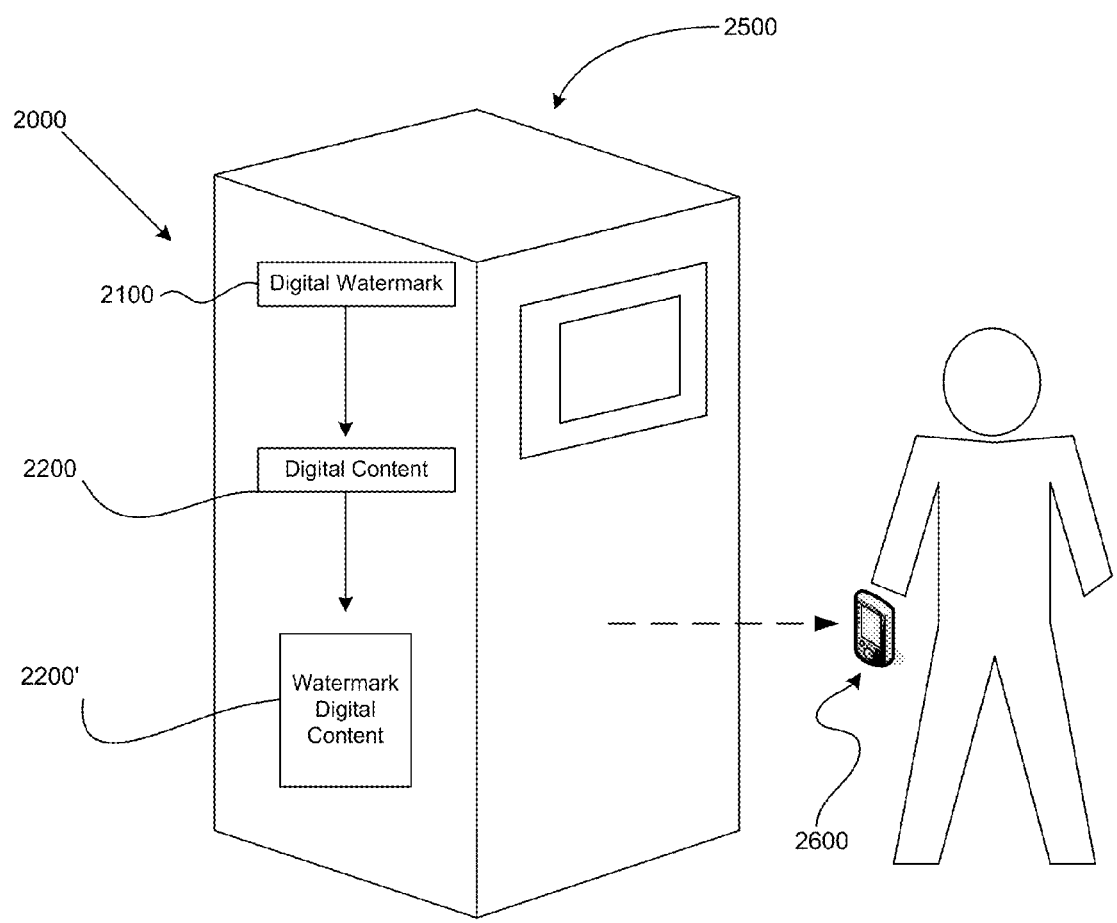
FIG. 7 shows other embodiments of digital watermark systems.

In other embodiments, the system for distributing the digital content need only contain a kiosk. In these embodiments, the system 2000 contains kiosk 2500 that distributes the watermarked digital content 2200' to a user, as shown in FIG. 7. A user of the kiosk 2500 purchases/rents/browser/views a watermarked digital content 2200' by selecting a desired digital content 2200 and inputting specific information into the kiosk 2500. The system 2000 may incorporate the information input by the user into a digital watermark 2100. The system 2000 then applies the digital watermark 2100 to the selected digital content 2200 to create the protected digital content 2200'. The kiosk 2500 may then distribute the protected digital content 2200' to the user's receiving device (depicted as a PDA 2600).

Using the kiosk 2500, the user may select from any available digital content at the kiosk, web or any associated databases and then obtain a copy of the digital content. This may be done by obtaining an audio CD or DVD containing the content; the digital content may also be downloaded to a portable device such as a portable music player or a portable storage device, including a USB-based solid state storage device, CompactFlash, Secure Digital card, MemoryStick, or other similar devices having the ability to store the digital content or transferred via an electronic network (i.e., the internet) to the customer's computer, set-top box. or game station. The digital content may then be played directly from an audio CD, DVD, or similar format storage media; may be played directly on the device to which the digital content was transferred; or may be copied from the portable storage device to the user's personal computer or other electronic device(s) as desired could be played from storage devices under the control of the consumer (i.e., hard drives, computer RAM, or other digital storage device).

The selected digital content (along with the watermark and any other information) can be transferred from the kiosk to a user's receiving device. For example, the user can receive a magnetic or optical storage device containing the digital content from a corresponding receptacle in the kiosk, i.e., CD/DVD burner ejector. Optionally, a jewel case (or any other type of enclosure) for the storage device can be received from the kiosk. In another example, the digital content is transferred from the kiosk using any wired electronic connection, such as a USB socket, or via any wireless transfer process.

Thus, in some instances the user's receiving device merely stores the watermarked digital content and it must transfer the digital content to another device that is capable of using/accessing the digital content. For example, a user can interact with the kiosk and provide a portable USB storage device. Upon downloading the digital content comprising a music file from the kiosk, the user may connect the USB storage device to the personal computer, transfer the digital content, and user the hardware/software on the persRonal computer to play that music.

In other instances, though, the user's device can immediately access/use that digital content, i.e., read a digital copy of a book. For example, a user can interact with the kiosk and provide a portable music player. Upon downloading the digital content comprising a music file from the kiosk to the portable music player, the music contains the watermark and may be played on the portable music player without further action on the part of the user.

Figure 8:
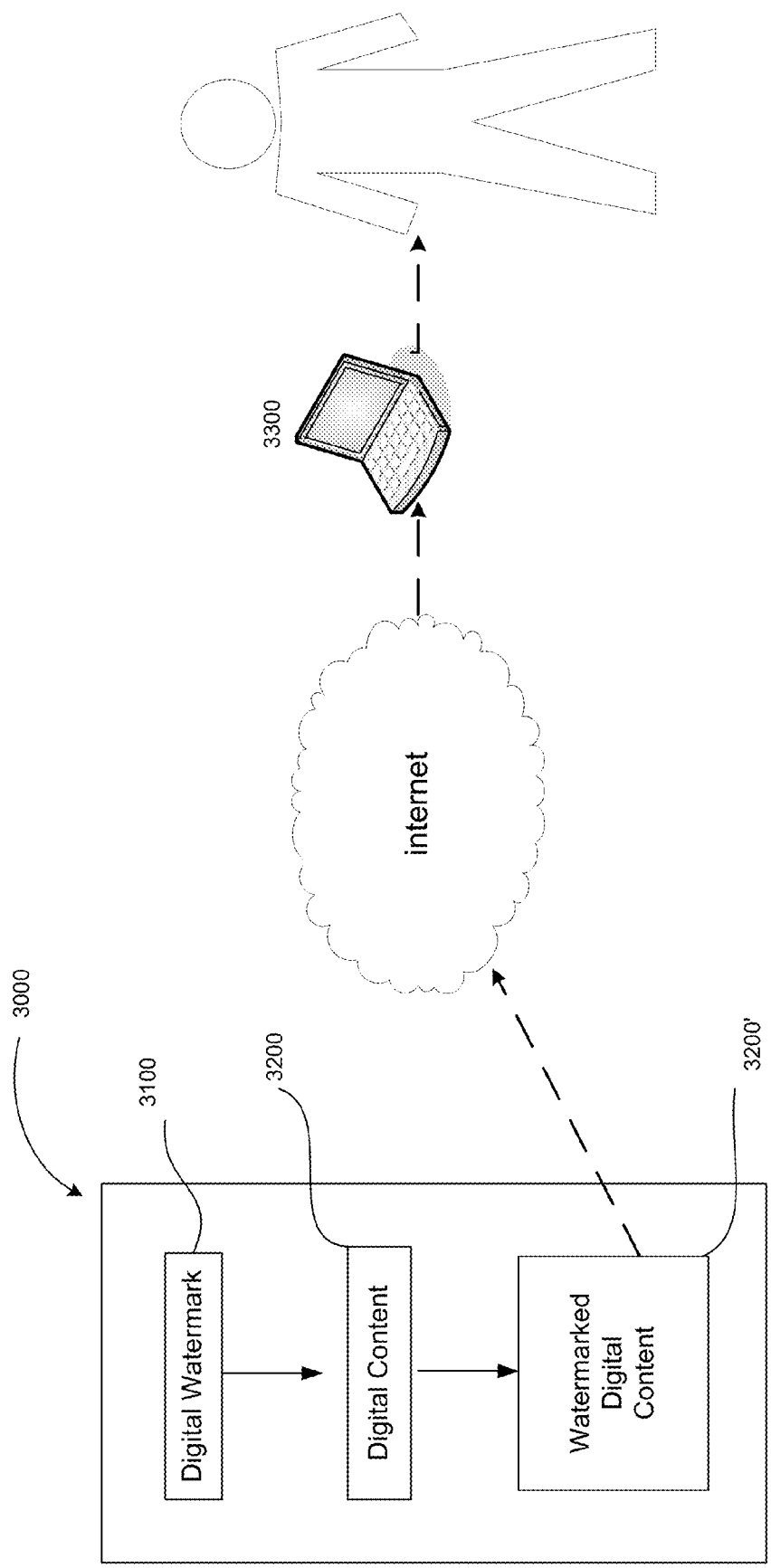
FIG. 8 shows yet other embodiments of digital watermark systems.

Another example of a distribution device can be any known computing device that is connected to an electronic network, whether that network is a private network or a public network (like the internet). This example is illustrated in FIG. 8 where the system 3000 is used with digital content that is distributed via the internet. A user via computing device 3300 may request any desired digital content and may be asked to provide identifying information to the system 3000. The system 3000 may use this information as fingerprint information in a digital watermark 3100. A digital watermark 3100 is then applied to the requested digital content 3200 by the system 3000 to create watermarked digital content 3200'. The system 3000 may then remove disposable parts of a watermarked digital content 3200' in order to preserve packet size, file size, etc. for distribution to the user over any desired internet protocol.

The devices and systems described herein can be used to carry out several methods. The first such method comprises protecting the digital content. Typically, the digital content can be protected by associating the watermark with the digital content using any desired parameter or combination of parameters, including those described herein.

Another method that can be carried using the system and devices described herein is to transfer the protected digital content. Typically, but not exclusively, the digital content is transferred only after it has been protected or partially protected. In some instances, the watermarked digital content is transferred to any electronic device described herein. In other instances, the protected digital content can be further transferred or distributed to other devices that are not described herein.

Yet another method comprises the use of the protected digital content. Once the protected digital content has been transferred to an appropriate user's device, it can be used according to the information contained in the watermark of the digital content. Of course, the methods of use will also depend on the type of the digital content: for music, it can be played; for books, it can be read; etc. But the use of the digital content can be limited and/or controlled by the information in the watermark.

Still yet another method involves the management of the digital content by using the information contained in the digital watermark. In this method, the system allows an operator to control the information associated with a given digital content. Thus, the operator (or content provider) can track the use of that digital content, can also view the purchasing and viewing habits of the consumer, what advertisement the consumer allowed to be played in their entirety, when the consumer stopped the advertisement, or can even provide suggestive sales which refer other content to the consumer.

The watermarks described herein and the systems and methods using the watermarks could be modified in several ways. One of these modifications would include that the watermark could also be used as a trigger so that when it is played with the digital content, the watermark captures some message, promotion, movie trailer, advertising, etc. from the internet and plays it along with the content. In some configurations, if the digital content was restricted in some manner (i.e., if the content was R-rated movie), it could require a password code before the content is released. In other configurations, the watermark could be used to display a message to the user. For example, if the digital content was part of a gift, a message (i.e., Happy Birthday) could be displayed on a specific date (i.e., the recipient's birthday). In some embodiments, the watermark could ask for information before it would allow you to continue on (i.e., an activation code) or an answer for enhanced educational testing, demographic information, or marketing information.

In another modification, if a portion of the watermark is removed, it could be configured to restrict access to the content. Thus, the watermarks would need to be in a specific order for the content to be used. In yet another modification, the water mark could be invisible or visible in the content, i.e., like the NBC presented in the bottom left corner of the televisions shows broadcast on this channel.

Using the systems and methods for protecting digital content using digital watermarks described improves on conventional watermarks. Conventional digital watermarks can be overcome or avoided by using compression and decompression processes which compress the content and decompress it with a computer formula that guesses what the lost content would look like. For example, when removing some of the pixels of a picture, these processes would estimate at what any particular pixel was and replace it when it is decompressed. But with the watermarks described herein, compression and decompression processes can't avoid the watermark because the compression would not only diminish the slide with the watermark on it, but also the content, thereby rendering the digital content unusable.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, examples are meant to be illustrative only and should not be construed to be limiting in any manner.

The invention claimed is:

1. A method for protecting digital content, comprising:
accessing digital content for download or physical distribution to a user;
separating a portion of the digital content into multiple segments;
obtaining user information from the user, wherein the user information is uniquely associated with the user of the digital content;
providing a digital watermark comprising watermark information and fingerprint information,
wherein the watermark information includes a transaction restriction configured to control methods by which the digital content can be used or distributed, a specification restriction defining conditions which must be satisfied prior to use or distribution according to the transaction restriction, and source contact information including purchasing habits, advertising, and coupon redemption, and
wherein the fingerprint information comprises the user information uniquely associated with the user of the digital content including at least one of a user name, user contact information, or user billing information;
providing the digital watermark as multiple segments and then combining them into a single digital watermark segment before insertion into the digital content; and
inserting the single digital watermark segment between the segments of the digital content.

2. The method of claim 1, further comprising selecting a portion of the digital content before separating it into segments.

3. The method of claim 2, further comprising randomly selecting the portion of the digital content to separate.

4. The method of claim 2, further comprising selecting a pre-determined portion of the digital content to separate.

5. The method of claim 1, wherein the digital watermark replaces some of the digital content segments when inserted.

6. The method of claim 1, further comprising:
inserting at least a portion of the digital watermark into the digital content on-the-fly in connection with a user interaction between the user and a system configured to apply the digital watermark to the digital content; and
distributing the watermarked digital content to the user.

7. A method for associating a digital watermark with digital content, comprising:
accessing digital content for download or physical distribution to a user;
selecting a predetermined portion of the digital content;
separating that portion of the digital content into multiple segments;
obtaining user information from the user, wherein the user information is uniquely associated with the user of the digital content;
providing a digital watermark comprising watermark information and fingerprint information,
wherein the watermark information includes a transaction restriction configured to control methods by which the digital content can be used or distributed, a specification restriction defining conditions which must be satisfied prior to use or distribution according to the transaction restriction, and source contact information including purchasing habits, advertising, and a coupon redemption, and
wherein the fingerprint information comprises the user information uniquely associated with the user of the digital content including at least one of a user name, user contact information, or user billing information;
providing the digital watermark as multiple segments and then combining them into a single digital watermark segment before insertion into the digital content; and
inserting the single digital watermark segment between the segments of the digital content.

8. The method of claim 7, further comprising:
inserting at least a portion of the digital watermark into the digital content on-the-fly in connection with a user interaction between the user and a system configured to apply the digital watermark to the digital content; and
distributing the watermarked digital content to the user by download or physical distribution.

9. A method for distributing watermarked digital content, comprising:
accessing digital content for download or physical distribution to a user;
selecting a predetermined portion of the digital content;
separating that portion of the digital content into multiple segments;
obtaining user information from a user, wherein the user information is uniquely associated with the user of the digital content;
providing a digital watermark comprising watermark information and fingerprint information,
wherein the watermark information includes a transaction restriction configured to control methods by which the digital content can be used or distributed a specification restriction defining conditions which must be satisfied prior to use or distribution according to the transaction restriction, and source contact information including purchasing habits, advertising, and coupon redemption, and
wherein the fingerprint information comprises the user information uniquely associated with the user of the digital content including at least one of a user name, user contact information, or user billing information;
providing the digital watermark as multiple segments and then combining them into a single digital watermark segment before insertion into the digital content; and
inserting the single digital watermark segment between the segments of the digital content in connection with distribution of the digital content.

10. A computer product comprising:
a computer readable memory device to store computer executable instructions that, when executed by a processing system, the computer executable instructions cause the processing system to implement operations comprising:
accessing digital content for download or physical distribution to a user;
selecting a predetermined portion of the digital content;
separating that portion of the digital content into multiple segments;
obtaining user information from a user, wherein the user information is uniquely associated with the user of the digital content;
providing a digital watermark comprising watermark information and fingerprint information,
wherein the watermark information includes a transaction restriction configured to control methods by which the digital content can be used or distributed, a specification restriction defining conditions which must be satisfied prior to use or distribution according to the transaction restriction, and source contact information including purchasing habits, advertising, and coupon redemption, and wherein the fingerprint information comprises the user information uniquely associated with the user of the digital content including at least one of a user name, user contact information, or user billing information;

providing the digital watermark as multiple segments and then combining them into a single digital watermark segment before insertion into the digital content; and inserting the single digital watermark segment between the segments of the digital content.

11. An apparatus comprising:

a receiving device to receive and store downloaded digital content for playback to a user, wherein a portion of the digital content is separated into segments with a digital watermark located between those segments, wherein the digital watermark comprises watermark information and fingerprint information, wherein the watermark information includes a transaction restriction configured to control methods by which the digital content can be used or distributed, a specification restriction defining conditions which must be satisfied prior to use or distribution according to the transaction restriction, and source contact information including purchasing habits, advertising, and coupon redemption, and wherein the fingerprint information comprises user information from a user and uniquely associated with the user of the digital content including at least one of a user name, user contact information, or user billing information, and wherein the digital watermark contains multiple segments which are combined into a single digital watermark segment before insertion into the digital content.

12. The apparatus of claim 11, wherein the single digital watermark segment has replaced some of the digital content segments.

13. A computer-implemented system for distributing watermarked digital content, comprising:

a first device for watermarking digital content, the first device comprising:

a first module for receiving or storing digital content;

a second module for receiving or creating a digital watermark comprising watermark information and fingerprint information, wherein the watermark information includes a transaction restriction configured to control methods by which the digital content can be used or distributed, a specification restriction defining conditions which must be satisfied prior to use or distribution according to the transaction restriction, and source contact information including purchasing habits, advertising, and coupon redemption, and wherein the fingerprint information comprises user information from a user, wherein the user information is uniquely associated with a user of the digital content and includes at least one of a user name, user contact information, or user billing information;

a third module for modifying the digital watermark into multiple segments and then combining them into a single digital watermark segment before insertion into the digital content; and a fourth module for dividing a portion of the digital content into segments and inserting the single digital watermark segment between the segments of the digital content; and a second device for distributing the watermark digital content by physical delivery or by download to a receiving device of a user.

14. The system of claim 13, wherein the first and second devices are different.

* * * * *